United States Patent
Oyamada et al.

(10) Patent No.: US 7,430,090 B2
(45) Date of Patent: Sep. 30, 2008

(54) STORAGE APPARATUS, CONTROL METHOD, CONTROL DEVICE, AND PROGRAM WHICH PREHEATS HEAD

(75) Inventors: Kazuhiro Oyamada, Kawasaki (JP); Koji Ishii, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 11/645,047

(22) Filed: Dec. 22, 2006

(65) Prior Publication Data

US 2008/0068739 A1 Mar. 20, 2008

(30) Foreign Application Priority Data

Sep. 14, 2006 (JP) .............. 2006-249265

(51) Int. Cl.
G11B 21/02 (2006.01)
G11B 27/36 (2006.01)
(52) U.S. Cl. ........................... 360/75; 360/31
(58) Field of Classification Search ........................ None
See application file for complete search history.

(56) References Cited

U.S. PATENT DOCUMENTS

| 7,088,545 B1 * | 8/2006 | Singh et al. ............... 360/75 |
| 7,324,299 B1 * | 1/2008 | Schreck et al. ............ 360/75 |
| 7,330,323 B1 * | 2/2008 | Singh et al. .............. 360/48 |
| 2003/0174430 A1 | 9/2003 | Takahashi et al. |
| 2005/0046985 A1 | 3/2005 | Morinaga et al. |
| 2005/0213250 A1 | 9/2005 | Kurita et al. |
| 2007/0230014 A1 * | 10/2007 | Yamashita et al. ........... 360/75 |

FOREIGN PATENT DOCUMENTS

| JP | 2002-037480 | 5/2002 |
| JP | 2003-272335 | 9/2003 |
| JP | 2005-071546 | 3/2005 |
| JP | 2005-276284 | 10/2005 |
| WO | WO 02/37480 | 5/2002 |

* cited by examiner

Primary Examiner—Jason C Olson
(74) Attorney, Agent, or Firm—Greer, Burns & Crain, Ltd.

(57) ABSTRACT

Upon correction, a preheat sector number measurement unit measures a preheat sector number which corresponds to transition time from when electric power distribution to and heating of the heater by preheat electric power is started until when it is stabilized to a predetermined target flying height. Upon reproduction or recording, a flying height control unit distributes electric power to the heater from a sector position which is before a target sector by the preheat sector number so as to perform preliminary heating, and then controls the flying height of the head to a predetermined target flying height from a target sector position.

15 Claims, 33 Drawing Sheets

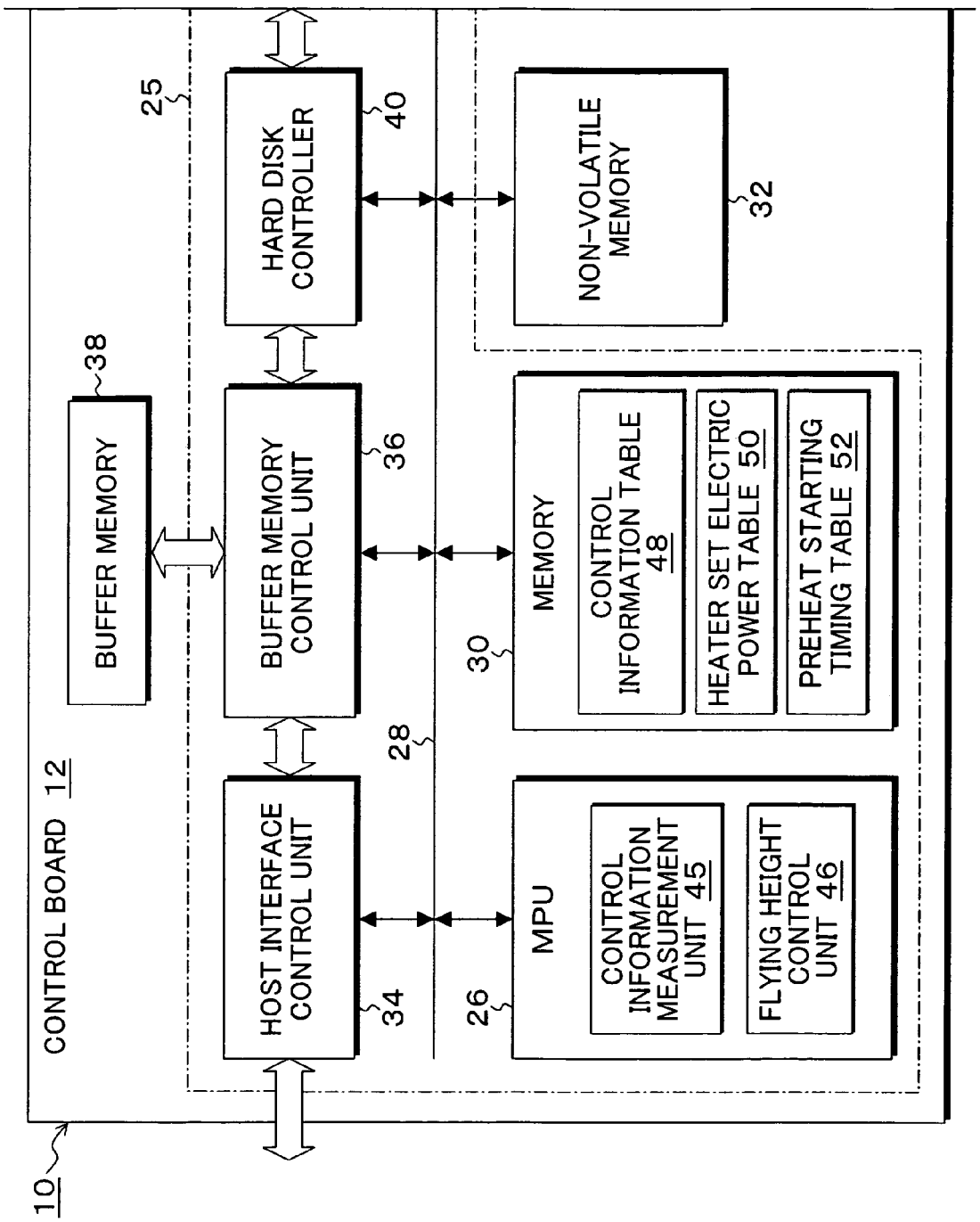

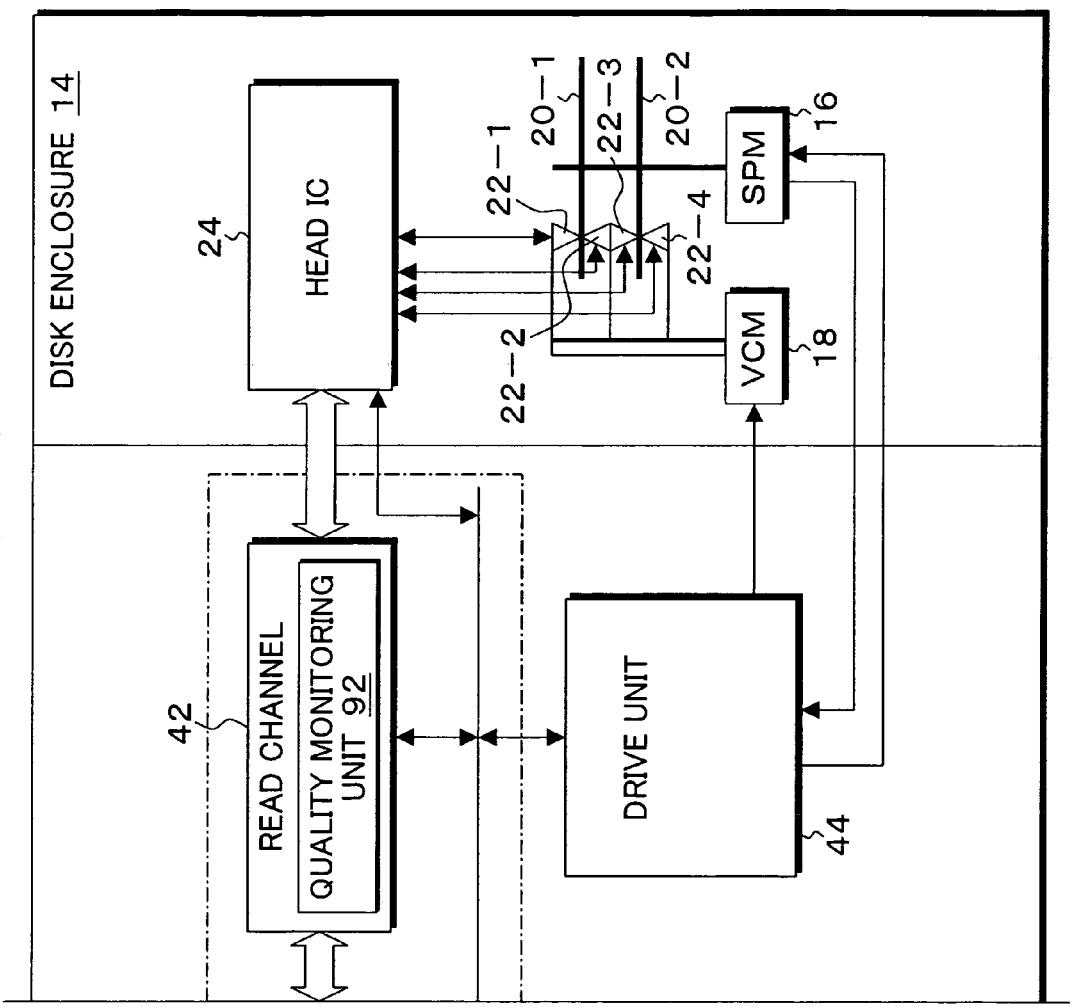
FIG. 1B

FIG. 5

| APPARATUS OPERATING TEMPERATURE | HEAD NUMBER | FLYING HEIGHT [nm] | TARGET FLYING HEIGHT [nm] | HEATER PROTRUSION SENSITIVITY [nm/w] | RECORDING CURRENT PROTRUSION VALUE [nm] |
|---|---|---|---|---|---|
| LOWER-LIMIT TEMPERATURE TLL | HH1 | do1 | dp | e1 | dw1 |
| LOW TEMPERATURE TL | HH1 | do2 | dp | e2 | dw2 |
| NORMAL TEMPERATURE TN | HH1 | do3 | dp | e3 | dw3 |
| HIGH TEMPERATURE TH | HH1 | do4 | dp | e4 | dw4 |

48

| APPARATUS OPERATING TEMPERATURE | HEATER SET ELECTRIC POWER | | |
|---|---|---|---|
| | READ HEATER ELECTRIC POWER | WRITE HEATER ELECTRIC POWER | PREHEAT ELECTRIC POWER |
| LOWER-LIMIT TEMPERATURE TLL | Pr1 | Pw1 | Pp1 |
| LOW TEMPERATURE TL | Pr2 | Pw2 | Pp2 |
| NORMAL TEMPERATURE TN | Pr3 | Pw3 | Pp3 |
| HIGH TEMPERATURE TH | Pr4 | Pw4 | Pp4 |

| APPARATUS OPERATING TEMPERATURE | PREHEAT SECTOR NUMBER | | | |
|---|---|---|---|---|
| | HH1 | HH2 | HH3 | HH4 |
| LOWER-LIMIT TEMPERATURE TLL | C11 | C21 | C31 | C41 |
| LOW TEMPERATURE TL | C12 | C22 | C32 | C42 |
| NORMAL TEMPERATURE TN | C13 | C23 | C33 | C43 |
| HIGH TEMPERATURE TH | C14 | C24 | C34 | C44 |

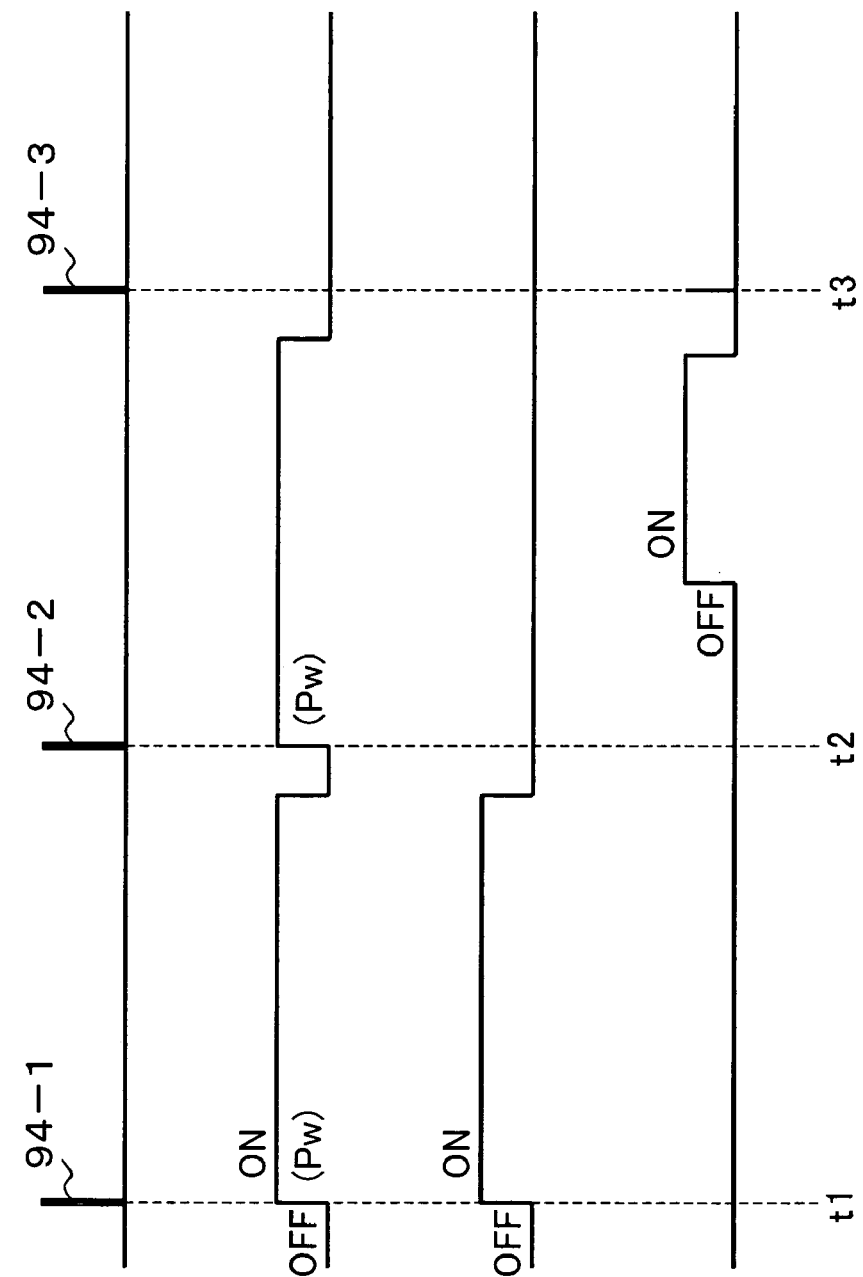

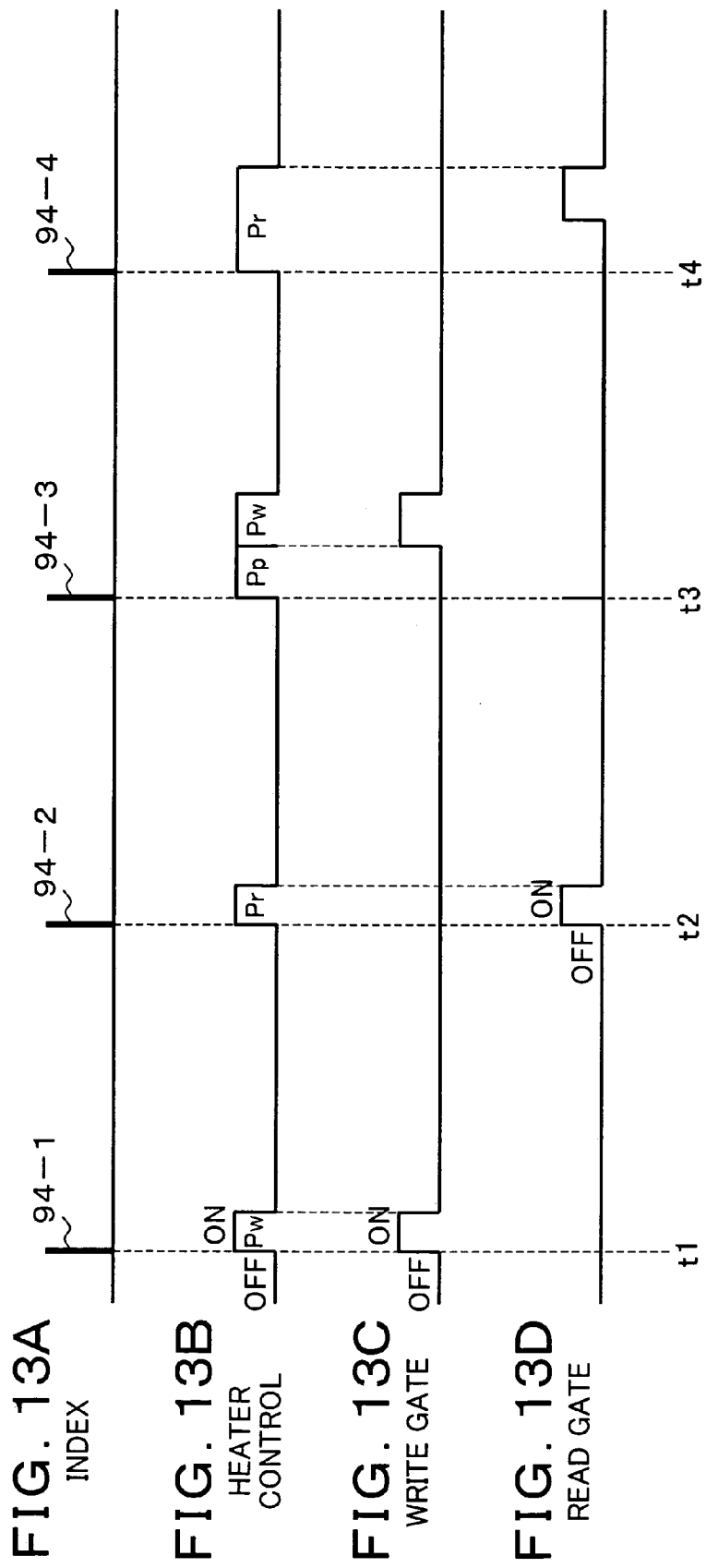

STORAGE APPARATUS, CONTROL METHOD, CONTROL DEVICE, AND PROGRAM WHICH PREHEATS HEAD

This application is a priority based on prior application No. 2006-249265, filed Sep. 14, 2006, in Japan.

BACKGROUND OF THE INVENTION

1. Field of the Invention

The present invention relates to a storage apparatus, a control method, a control circuit, and a program for reading/writing data by causing a head to fly over a rotating recording medium, and particularly relates to a storage apparatus, a control method, and a control circuit for controlling the flying height between a head and a recording medium surface to a predetermined target flying height by varying a protrusion value by thermal expansion which accompanies electric power distribution to and heating of a heater provided in the head.

2. Description of the Related Arts

Conventionally, the flying height of a head with respect to the recording surface of a magnetic disk has to be reduced in order to realize a high recording density of a magnetic disk apparatus, and a flying height of 10 nm order has been realized recently. However, when the flying height of the head is reduced, collision with minute protrusions on the magnetic disk surface is readily caused, and variation in the clearances between heads is present in the range of mechanical common differences; therefore, there is a problem that the flying height cannot be set lower than the range of common differences when the medium contact is taken into consideration. Therefore, recently, like Patent Document 1, there is proposed a method in which variation in the protrusion value (TPR value) caused by a phenomenon in which the head flying surface protrudes toward the direction of the magnetic disk due to temperature increase in a write head (thermal protrusion: TPR) is measured in an examination process or the like and retained in a magnetic disk, and the data is used for managing the flying height for each head. Furthermore, there have also been proposed methods like Patent Documents 2 and 3 in which a heater is incorporated in a head, and the clearance between the head and the recording surface of a magnetic disk is controlled by utilizing the protrusion phenomenon caused by thermal expansion of the head flying surface accompanying electric power distribution to the heater. In Patent Document 2, a constant element temperature is maintained by varying the electric power applied to an electricity conduction film provided on the head relative to increase in the apparatus temperature or the element temperature due to recording/reproduction, thereby maintaining a constant clearance between the element and the recording medium. In Patent Document 3, a flying-height-increasing heating device which increases the distance between the recording reproduction element and the magnetic disk surface by causing a part of an air bearing surface of the head to expand and protrude by heating, and a flying-height-reducing heating device which reduces the distance between the recording/reproduction element and the magnetic disk surface by causing another part of the head air bearing surface to expand and protrude by heating are provided in the head, and the flying height is corrected such that reproduction can be performed without causing collision during apparatus activation or the like.

However, in such conventional methods of controlling the flying height between the head and the magnetic disk recording surface, basically, the protrusion value is adjusted such that reproduction can be performed without causing medium contact by utilizing that the flying height is varied due to expansion/protrusion of the head flying surface along with electric power distribution to and heating of the heater; and there has been a problem that highly precise flying height control of controlling the flying height upon recording and reproduction to a constant target flying height by taking variation in the flying heights which are different in heads into consideration cannot be performed. In addition, there is a slight delay until the flying height is stabilized after it is varied by protrusion caused by thermal expansion after electric power is distributed to the heater. Therefore, in conventional flying height control using heater electric power distribution upon recording, the write starting part is not in the state that thermal expansion of the head is not completely saturated, and the flying height of the head is close to the recording medium and has not reached a target flying height; therefore, there is a problem that writing performance of a recording element is low, and the error rate is deteriorated at the writing started part. In order to solve this problem, electric power distribution to the heater is started from a target track position, and then writing is performed after waiting for one rotation; thus, thermal expansion of the head can be completely saturated so as to stabilize the target flying height, and the problem that the error rate is deteriorated at the writing starting part can be solved. However, there are problems that access performance is deteriorated since rotation waiting is required for thermal expansion saturation caused by heater electric power distribution; and, furthermore, electric power consumption is increased, and deterioration of the head element is accelerated since electric power distribution and heating using the heater is performed more than necessary. These problems are similarly generated also in conventional flying height control using heater electric power distribution upon reproduction.

SUMMARY OF THE INVENTION

According to the present invention to provide a storage apparatus, a control method, and a control circuit for preventing rotation waiting and wasteful electric power distribution and heating of the heater by preliminary heating the heater at optimum timing before a writing or reading starting position.

(Control Device)

The present invention provides a control circuit of a storage apparatus. The present invention is a control circuit of a storage apparatus having a head which has a reading element and a recording element, is provided with a heater which varies a protrusion value by thermal expansion accompanying electric power distribution and heating, and flies above a rotating recording medium so as to access data, characterized by having a preheat sector number measurement unit which, upon desired correction, measures a preheat sector number corresponding to transition time from when electric power distribution to and heating of the heater is started by predetermined preheat electric power until when a flying height is stabilized to a predetermined target flying height; and a flying height control unit which, upon reproduction or recording, distributes electric power to the heater from a sector position before a target sector by the preheat sector number so as to preliminarily heat the heater and then controls the flying height of the head to the predetermined target flying height from a target sector position.

Herein, the preheat sector number measurement unit has a first mode measurement processing unit which writes test data over one track by the recording element by using a rotation reference position as a starting point in a state in which positioning to an arbitrary measurement track of the recording medium is achieved and while distribution of the preheat electric power to and heating of the heater is performed, and then reads the test data by the reading element so as to measure a predetermined evaluation value as a threshold value; and a second mode measurement processing unit which starts distribution of the preheat electric power to and heating of the heater by using the rotation reference position as a starting point, sequentially performs writing and reading of test data to or from each of sectors on the measurement track so as to measure the evaluation value in the order of the sectors, and, when the sector which satisfies the threshold value is determined, determines the number of sectors up to the determined sector as the preheat sector number.

The first mode measurement processing unit reads the test data so as to measure an error rate threshold value; and, when an error rate is measured in the order of the sectors and the sector equal to or less than the error rate threshold value is determined, the second mode measurement unit determines the number of sectors up to the determined sector as the preheat sector number.

The first mode measurement processing unit reads the test data so as to measure a signal quality monitoring value and use the value as a threshold value; and, when the sector which satisfies the threshold value is determined by measuring the signal quality monitoring value in the order of the sectors, the second mode measurement unit determines the number of sectors up to the determined sector as the preheat sector number.

The preheat sector number measurement unit measures the preheat sector number separately for each of the head, a zone of the recording medium, and an operating temperature of the apparatus.

The flying height control unit has a write flying height control unit which distributes predetermined preheat electric power to the heater from a sector position which is before the target sector by the preheat sector number so as to preliminarily heat the heater, switches the electric power to write heat electric power which is for control to a predetermined write target clearance when the head reaches the target sector so as to perform recording, and stops the heater electric power distribution at a next sector position after recording is finished; and a read flying height control unit which distributes predetermined preheat electric power to the heater from a sector position which is before the target sector by the preheat sector number so as to preliminarily heat the heater, switches the electric power to read heat electric power which is for control to a predetermined read target clearance when the head reaches the target sector so as to perform reading, and stops the heater electric power distribution at a next sector position after reading is finished.

The write flying height control unit performs switch to, as the write heat electric power, electric power which is obtained by subtracting heat electric power corresponding to flying height variation according to a recording current protrusion value of the recording element from the preheat electric power. The read flying height control unit sustains electric power which is same as the preheat electric power as the read heat electric power.

(Method)

The present invention provides a control method of a storage apparatus. The present invention is a control method of a storage apparatus having a head which has a reading element and a recording element, is provided with a heater which varies a protrusion value by thermal expansion accompanying electric power distribution and heating, and flies above a rotating recording medium so as to access data, characterized by having a preheat sector number measurement step in which, upon desired correction, a preheat sector number corresponding to transition time from when electric power distribution to and heating of the heater is started by predetermined preheat electric power until when a flying height is stabilized to a predetermined target flying height is measured; and a flying height control step in which, upon reproduction or recording, electric power is distributed to the heater from a sector position before a target sector by the preheat sector number so as to preliminarily heat the heater and then the flying height of the head is controlled to the predetermined target flying height from a target sector position.

(Storage Apparatus)

The present invention provides a storage apparatus. The present invention is a storage apparatus characterized by having a head which has a reading element and a recording element, is provided with a heater which varies a protrusion value by thermal expansion accompanying electric power distribution and heating, and flies above a rotating recording medium so as to access data;

a preheat sector number measurement unit which, upon desired correction, measures a preheat sector number corresponding to transition time from when electric power distribution to and heating of the heater is started by predetermined preheat electric power until when a flying height is stabilized to a predetermined target flying height; and a flying height control unit which, upon reproduction or recording, distributes electric power to the heater from a sector position before a target sector by the preheat sector number so as to preliminarily heat the heater and then controls the flying height of the head to the predetermined target flying height from a target sector position.

(Another Mode of the Storage Control Device)

The present invention provides a control device of a storage apparatus of another mode. The present invention is a control device of a storage apparatus having a head which has a reading element and a recording element, is provided with a heater which varies a protrusion value by thermal expansion accompanying electric power distribution and heating, and flies above a rotating recording medium so as to access data, characterized by having a preheat electric power measurement unit which, upon desired correction, measures optimal preheat electric power which stabilizes a flying height to a predetermined target flying height when the head reaches a target sector through electric power distribution and heating over a predetermined fixed preheat sector number; and a flying height control unit which, upon reproduction or recording, sets the optimal preheat electric power and distributes the electric power to the heater from a sector position before a target sector by the preheat sector number so as to preliminarily heat the heater and then controls the flying height of the head to the predetermined target flying height from a target sector position.

The preheat electric power measurement unit has a first mode measurement processing unit which writes test data over one track by the recording element by using a rotation reference position as a starting point in a state in which positioning to an arbitrary measurement track of the recording medium is achieved and while distribution of the preheat electric power to and heating of the heater is performed, and then reads the test data by the reading element so as to measure a predetermined evaluation value as a threshold value; and a second mode measurement processing unit which sequentially performs writing and reading of test data to or from a next target sector of the fixed preheat sector number by using the rotation reference position as a starting point while preheat electric power is varied so as to measure the evaluation value, and determines the preheat electric power which satisfies the evaluation threshold value as optimal preheat electric power which is distributed over the fixed preheat sector number.

The first mode measurement processing unit reads the test data so as to measure an error rate threshold value; and, when an error rate is measured in the order of the sectors and the sector equal to or less than the error rate threshold value is determined, the second mode measurement unit determines the preheat electric power at that point as the optimal preheat electric power.

The first mode measurement processing unit reads the test data so as to measure a signal quality monitoring value and use the value as a threshold value; and, when the sector which satisfies the threshold value is determined by measuring the signal quality monitoring value in the order of the sectors, the second mode measurement unit determines the preheat electric power at that point as the optimal preheat electric power.

The preheat electric power measurement unit measures the optimal preheat electric power separately for at least any one of the head, a zone of the recording medium, and an operating temperature of the apparatus.

The flying height control unit has a write flying height control unit which distributes the optimal preheat electric power to the heater from a sector position which is before the target sector by the fixed preheat sector number so as to preliminarily heat the heater, switches the electric power to write heat electric power which is for control to a predetermined write target clearance when the head reaches the target sector so as to perform recording, and stops the heater electric power distribution at a next sector position after recording is finished; and a read flying height control unit which distributes the optimal preheat electric power to the heater from a sector position which is before the target sector by the fixed preheat sector number so as to preliminarily heat the heater, switches the electric power to read heat electric power which is for control to a predetermined read target clearance when the head reaches the target sector so as to perform reading, and stops the heater electric power distribution at a next sector position after reading is finished.

(Another Mode of Control Method)

The present invention provides a control method of a storage apparatus of another mode. The present invention is a control method of a storage apparatus having a head which has a reading element and a recording element, is provided with a heater which varies a protrusion value by thermal expansion accompanying electric power distribution and heating, and flies above a rotating recording medium so as to access data, the control device characterized by having a preheat electric power measurement step in which, upon desired correction, optimal preheat electric power which stabilizes a flying height to a predetermined target flying height when the head reaches a target sector through electric power distribution and heating over a predetermined fixed preheat sector number is measured; and a flying height control step in which, upon reproduction or recording, the optimal preheat electric power is set and distributed to the heater from a sector position before a target sector by the preheat sector number so as to preliminarily heat the heater, and then the flying height of the head is controlled to the predetermined target flying height from a target sector position.

The preheat electric power measurement step has a first mode measurement processing step in which test data is written over one track by the recording element by using a rotation reference position as a starting point in a state in which positioning to an arbitrary measurement track of the recording medium is achieved and while distribution of the preheat electric power to and heating of the heater is performed, and then the test data is read by the reading element so as to measure a predetermined evaluation value as a threshold value; and a second mode measurement processing step in which writing and reading of test data to or from a next target sector of the fixed preheat sector number is sequentially performed by using the rotation reference position as a starting point while preheat electric power is varied so as to measure the evaluation value, and the preheat electric power which satisfies the evaluation threshold value is determined as optimal preheat electric power which is distributed over the fixed preheat sector number.

(Another Mode of Storage Apparatus)

The present invention provides a storage apparatus of another mode. The storage apparatus of the present invention is characterized by having a head which has a reading element and a recording element, is provided with a heater which varies a protrusion value by thermal expansion accompanying electric power distribution and heating, and flies above a rotating recording medium so as to access data;

a preheat electric power measurement unit which, upon desired correction, measures optimal preheat electric power which stabilizes a flying height to a predetermined target flying height when the head reaches a target sector through electric power distribution and heating over a predetermined fixed preheat sector number; and a flying height control unit which, upon reproduction or recording, sets the optimal preheat electric power and distributes the electric power to the heater from a sector position before a target sector by the preheat sector number so as to preliminarily heat the heater, and then controls the flying height of the head to the predetermined target flying height from a target sector position.

The preheat electric power measurement unit has a first mode measurement processing unit which writes test data over one track by the recording element by using a rotation reference position as a starting point in a state in which positioning to an arbitrary measurement track of the recording medium is achieved and while distribution of the preheat electric power to and heating of the heater is performed, and then reads the test data by the reading element so as to measure a predetermined evaluation value as a threshold value; and a second mode measurement processing unit which sequentially performs writing and reading of test data to or from a next target sector of the fixed preheat sector number by using the rotation reference position as a starting point while preheat electric power is varied so as to measure the evaluation value, and determine the preheat electric power which satisfies the evaluation threshold value as optimal preheat electric power which is distributed over the fixed preheat sector number.

According to the present invention, based on evaluation of an error rate or a signal quality monitoring value through writing and reading of test data using a measurement track upon correction, the transition time from when a heater is turned on until when heating expansion is saturated is measured and saved as a preheat sector number, and preheat electric power is distributed upon recording or reproduction to the heater so as to heat the heater from a sector which is before by the preheat sector number measured in advance; thus, when it reaches a target sector, the heating expansion of the head is caused to be in a saturated state, and a target flying height can be ensured from a write starting part or a read starting part. Therefore, writing performance and reading performance is enhanced, and highly reliable recording or reproduction can be realized. Moreover, when optimal preheat sector numbers are measured respectively for heads, zones of a recording medium and, furthermore, for apparatus operating temperatures, regardless of variation of heads and temperature variation, control to an optimal target flying height which varies a protrusion value by thermal expansion accompanying electric power distribution and heating of the heater is performed, writing performance and reading performance is enhanced even when the recording density is high, and highly reliable recording and reproduction can be realized. The above and other objects, features, and advantages of the present invention will become more apparent from the following detailed description with reference to the drawings.

BRIEF DESCRIPTION OF THE DRAWINGS

FIGS. 1A and 1B are block diagrams of a magnetic disk apparatus showing an embodiment of a storage apparatus according to the present invention;

FIG. 5 is an explanatory diagram of a control information table used in the present embodiment;

FIG. 7 is an explanatory diagram of a preheat sector number administration table used in the present embodiment;

FIGS. 11A to 11D are time charts showing an operation of the first mode measurement process of FIGS. 10A and 10B;

FIGS. 13A to 13D are time charts showing an operation of the first mode measurement process of FIGS. 12A and 12B;

DETAILED DESCRIPTION OF THE PREFERRED EMBODIMENTS

Figure 2:
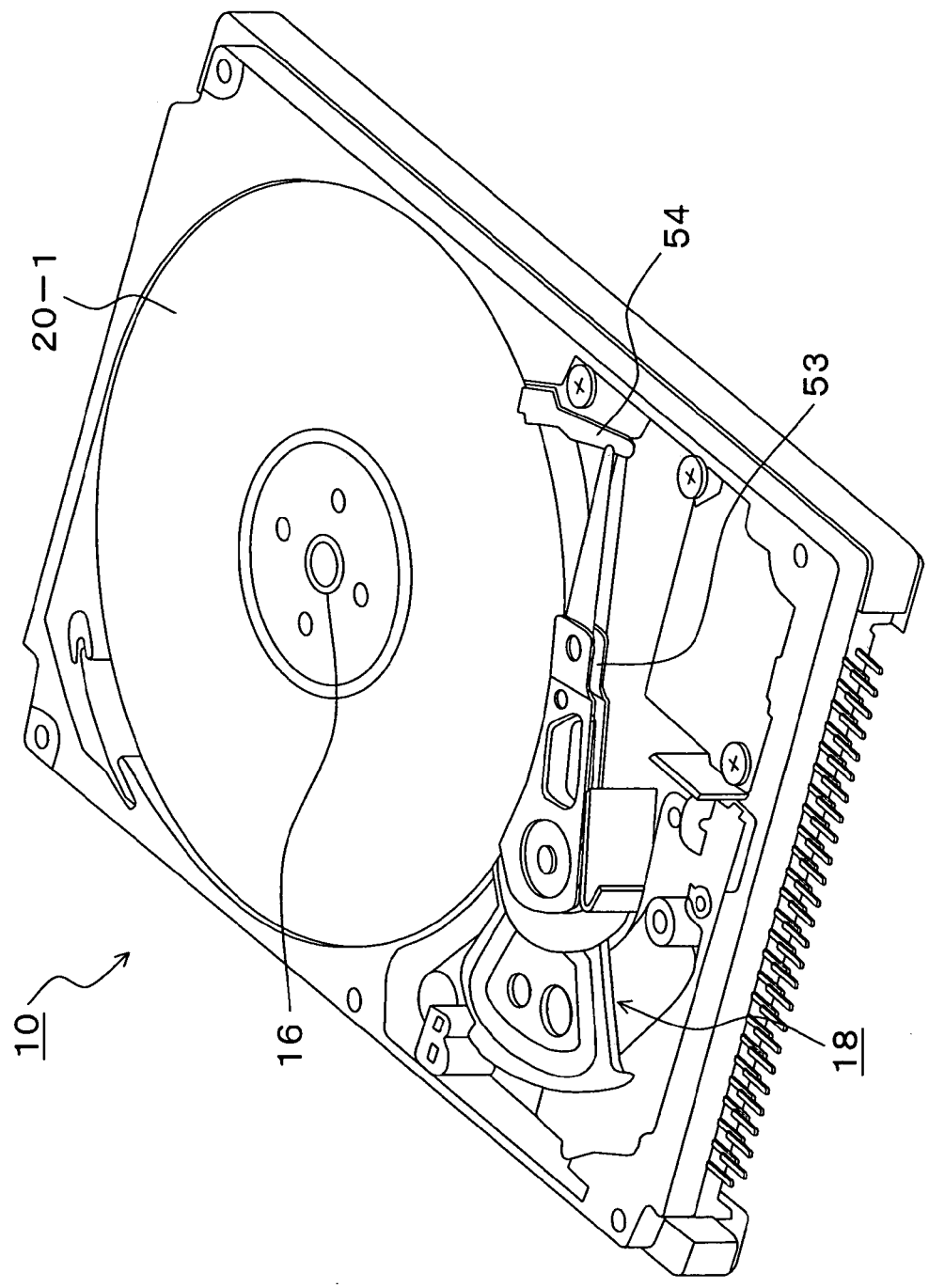
FIG. 2 is an explanatory drawing of a mechanism structure of the magnetic disk apparatus according to the present embodiment.

FIGS. 1A and 1B are block diagrams showing an embodiment of a magnetic disk apparatus according to the present invention. In FIGS. 1A and 1B, the magnetic disk apparatus 10 which is known as a hard disk drive (HDD) is composed of a disk enclosure 14 and a control board 12. A spindle motor (SPM) 16 is provided in the disk enclosure 14; and magnetic disks (storage media) 20-1 and 20-2 are attached to a rotating shaft of the spindle motor 16 and rotated at, for example, 4200 rpm for a certain period of time. In addition, a voice coil motor (VCM) 18 is provided in the disk enclosure 14, wherein the voice coil motor 18 has distal ends of arms of head actuators on which heads 22-1 to 22-4 are loaded and performs positioning of the heads with respect to recording surfaces of the magnetic disks 20-1 and 20-2. In addition, recording elements and reading elements are loaded on the heads 22-1 to 22-4 in an integrated manner. The heads 22-1 to 22-4 are connected to a head IC 24 by signal lines, and the head IC 24 selects one of the heads according to a head select signal based on a write command or a read command from a host, which serves as an upper-level apparatus, so as to perform a write or a read. Moreover, in the head IC 24, a write amplifier is provided for a write system, and a pre-amplifier is provided for a read system. An MPU 26 is provided in the control board 12, and, with respect to a bus 28 of the MPU 26, a memory 30, which uses a RAM and stores a control program and control data, and a non-volatile memory 32, which uses an FROM or the like and stores a control program, are provided. In addition, with respect to the bus 28 of the MPU 26, a host interface control unit 34, a buffer memory control unit 36 which controls a buffer memory 38, a hard disk controller 40, a read channel 42 which functions as a write modulation unit and a read modulation unit and has a quality monitoring unit 92, a drive unit 44 which controls the voice coil motor 18 and the spindle motor 16 are provided. Herein, the MPU 26, the memory 30, the host interface control unit 34, the buffer memory control unit 36, the hard disk controller 40, and the read channel 42 in the control board 12 can be composed as one control device 25; and, specifically, the control device 25 is composed as one LSI device. The magnetic disk apparatus 10 performs writing processes and reading processes based on commands from the host. Herein, normal operations in the magnetic disk apparatus will be described below. When a write command and write data from the host are received by the host interface control unit 34, the write command is decoded by the MPU 26, and the received write data is stored in the buffer memory 38 in accordance with needs. Then, it is converted into a predetermined data format by the hard disk controller 40, an ECC code is added thereto by ECC processing, and scrambling, RLL code conversion, and write compensation are performed in the write modulation system in the read channel 42. Then, it is written to a magnetic disk 20 from the write amplifier via the head IC 24 and from the recording element of, for example, the selected head 22-1. In this course, the MPU 26 gives a head positioning signal to the drive unit 44 having a VCM motor driver, etc., and, after a target track which is specified by the command is sought, the head is caused to be placed on the track by the voice coil motor 18 so as to perform track following control. Meanwhile, when a read command from the host is received by the host interface control unit 34, the read command is decoded by the MPU 26, read signals read by the reading element of the head 22-1 which is selected by head selection of the head IC 24 are amplified by the pre-amplifier. Then, they are input to the read demodulation system of the read channel 42, read data is demodulated by partial response maximum likelihood detection (PRML) or the like, and errors are detected and corrected by performing ECC processing by the hard disk controller 40. Then, they are subjected to buffering to the buffer memory 38, and the read data is transferred to the host from the host interface control unit 34. As functions of the present embodiment realized in the MPU 26 by executing programs, a control information measurement unit 45 and a flying height control unit 46 are provided. The heads 22-1 to 22-4 of the present embodiment have the reading elements and the recording elements and are provided with heaters which vary the protrusion value by thermal expansion accompanying heating caused by electric power distribution. For example in an examination process in a plant, the control information measurement unit 45 measures, for each head, each zone of the magnetic disks, and each apparatus operating temperature, flying height information which is required for controlling the flying heights between respective reading elements and the recording surfaces of the magnetic disks 20-1 to 20-2 for each of the heads 22-1 to 22-4 at the timing of a self correction process when the magnetic disk apparatus 10 is activated, and the control information measurement unit records that to system areas of the magnetic disks 20-1, 20-2 or the non-volatile memory 32 of the apparatus. The control information measured by the control information measurement unit 45 for example includes the following.

(1) Flying height do when electric power is not distributed to the heater
(2) Heater protrusion sensitivity e which is a head protrusion value per unit electric power distributed to the heater
(3) Recording current protrusion value dw of the head when a recording current is caused to flow a recording element
(4) A number of preheat sectors for determining preheat starting timing before a target sector Regarding the control information, the control information corresponding to a target track is acquired by referencing a control information table 48, a heater set electric power table 50, and a preheat sector number administration table 52 which are deployed from the system area of the magnetic disk to the memory 30 upon power-on. The flying height control unit 46 varies the electric power distributed to the heater provided in the head, thereby controlling the flying height to a predetermined target flying height upon reproduction and recording by varying the protrusion value of the head.

FIG. 2 shows an inner structure of the disk enclosure 14 in the magnetic disk apparatus 10 of FIGS. 1A and 1B. In FIG. 2, in the magnetic disk apparatus 10, the magnetic disks 20-1 and 20-2 rotated by the spindle motor 16 are incorporated, head actuators 53 which are driven by the voice coil motor 18 with respect to the magnetic disks 20-1 and 20-2 are provided, and the heads are attached to the distal ends of the head actuators 53. The head actuators 53 are at retracted positions in the state shown in the drawing, and, at this point, the head parts at the distal ends of the head actuators 53 are retracted on a ramp mechanism 54 which is disposed toward the head thrown-out direction with respect to the magnetic disks 20-1 and 20-2. When electric power of the magnetic disk apparatus is turned on, the magnetic disks 20-1 and 20-2 are rotated by the spindle motor 16, and, when the number of rotations reaches a constant number of rotations, the head actuators 53 are turned by the voice coil motor 18 to the side of the magnetic disks 20-1 and 20-2, thereby throwing out the heads from the ramp mechanism 54 onto the magnetic disks 20-1 and 20-1.

Figure 3A:
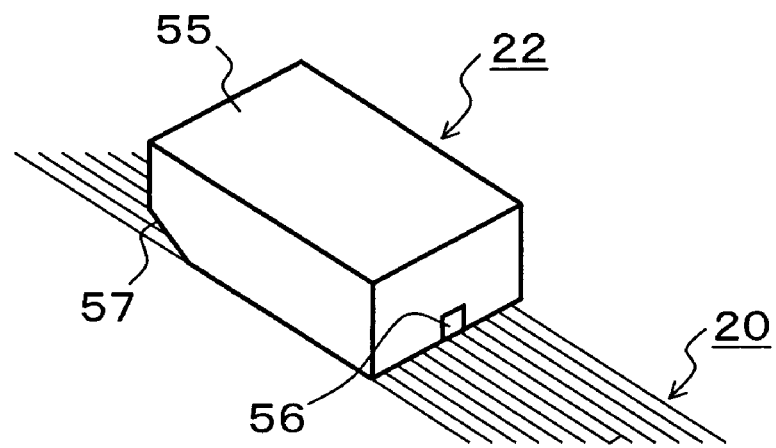
FIGS. 3A and 3B are explanatory drawings of a head structure of the present embodiment.
Figure 3B:
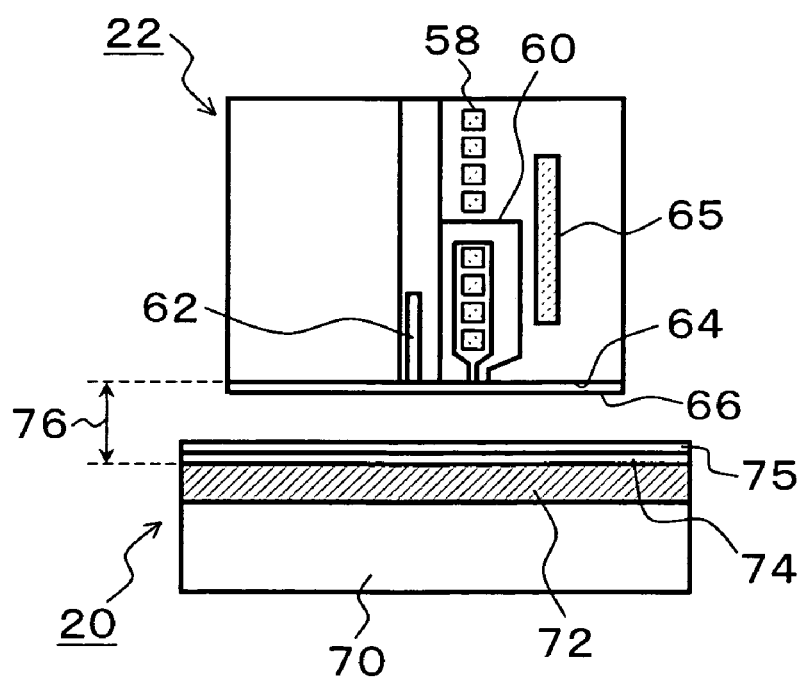

FIGS. 3A and 3B show explanatory drawings of a head structure of the present embodiment. FIG. 3A focuses on a head 22 which is used in the present embodiment, wherein a reading element and a recording element are formed on an end face of a slider 55 which is made of, for example, a ceramic material. A tapered surface 57 is formed in the distal end side of the flying surface of the slider 55 which is opposed to the magnetic disk 20, and an air communication groove 56 is formed on the flying surface in the track direction.

FIG. 3B is a cross sectional view wherein the head 22 is viewed in the track direction. A recording coil 58 and a recording core 60 are provided as the recording element in the head 22 which is made of ceramic or the like. A reading element 62 is provided in the left side of the recording element such that it is adjacent thereto. As the reading element 62, a GMR element (Giant Magneto Resistance element) or a TMR element (Tunneling Magneto Resistance element) is used. The surface of the head 22 opposed to the magnetic disk 20 is an ABS surface (Air Bearing Surface) 64, and a protective film 66 is formed on the surface thereof. On the other hand, in the magnetic disk 20, a recording film 72 is formed on a substrate 70, a protective film 74 is formed subsequent to the recording film 72, and a lubricant 75 is further provided on the surface. In the present embodiment, a heater 65 is provided such that it is close to the recording core 60 which constitutes the recording element of the head 22. When electric power is distributed to the heater 65 so as to carry out heating, the ABS surface 64 serving as the flying surface of the head 22 expands and protrudes toward the magnetic disk 20 side. A flying height 76 between the head 22 and the magnetic disk 20 is defined as a distance from the lower end of the reading element 62 to the recording film 72 of the magnetic disk 20.

Figure 4:
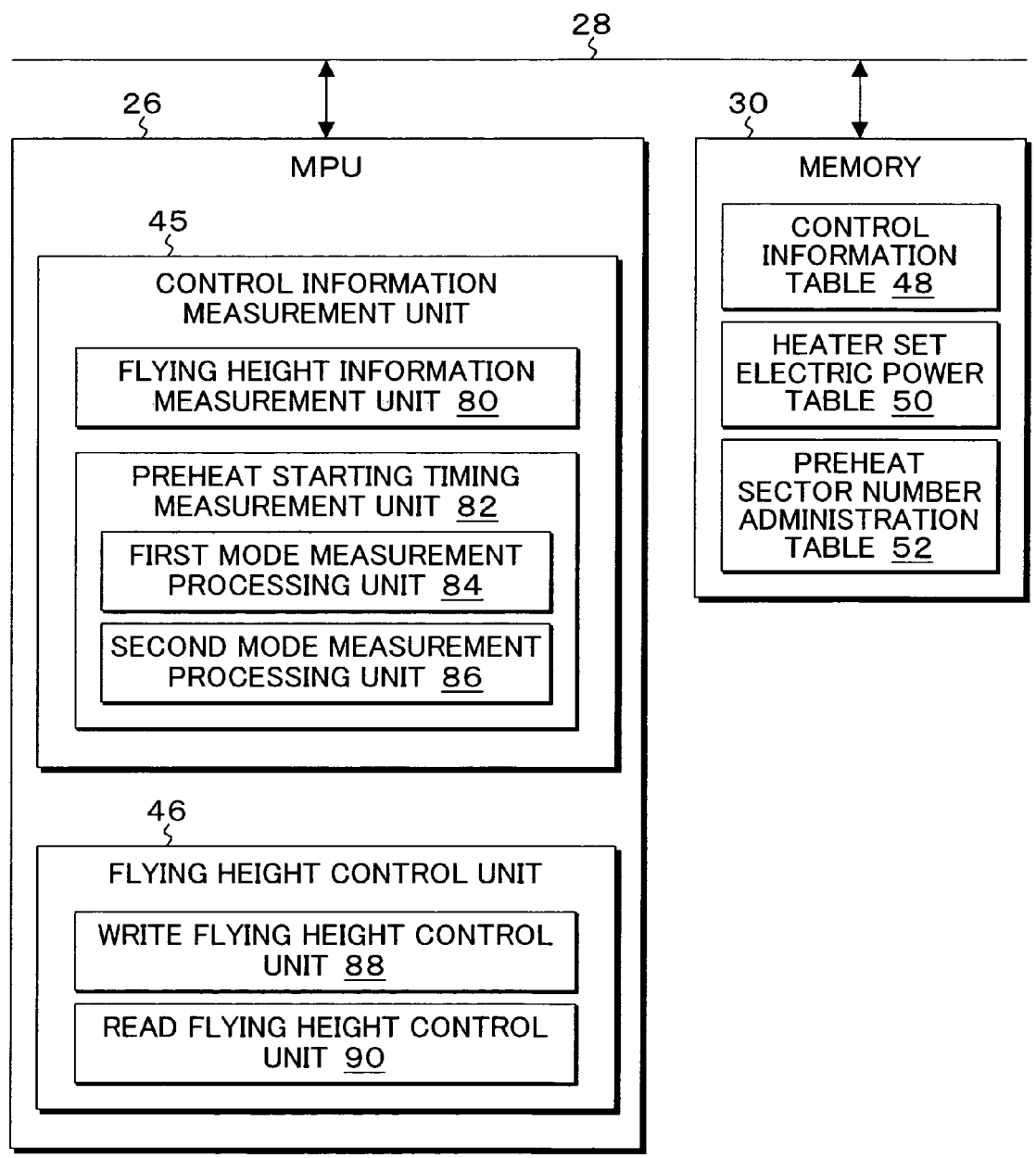
FIG. 4 is a block diagram showing details of a functional configuration of a MPU in the present embodiment.

FIG. 4 is a block diagram showing details of a functional configuration of the MPU 26 in the present embodiment. In FIG. 4, a firmware program of the MPU 26 provides a flying height information measurement unit 80 and a preheat sector number measurement unit 82 in the control information measurement unit 45 and provides a first mode measurement processing unit 84 and a second mode measurement processing unit 86 in the preheat sector number measurement unit 82. Corresponding to the flying height information measurement unit 80, the control information table 48 storing measurement results and the heater set electric power table 50 are provided in the memory 30. In addition, corresponding to the preheat sector number measurement unit 82, the preheat sector number administration table 52 is provided in the memory 30. Furthermore, the flying height control unit 46 is provided in the MPU 26, and a write flying height control unit 88 and a read flying height control unit 90 are provided in the flying height control unit 46. The control information measurement unit 45 is a function realized by executing the firmware which is downloaded in an examination process in a plant; and, when a measurement process is finished, the firmware is deleted from the magnetic disk apparatus, so that the measurement process is not performed in a user operating state after shipment from the plant. As a matter of course, it can be shipped while the firmware of the control information measurement process is remaining in the magnetic disk apparatus, so that the control information measurement process is executed in accordance with needs during user operation.

FIG. 5 is an explanatory diagram of the control information table 48 measured by the flying height information measurement unit 80 of FIG. 4. In FIG. 5, the control information table 48 has items of apparatus operating temperatures, head numbers, flying heights, target flying heights, heater protrusion sensitivity, and recording current protrusion values. In the present embodiment, the recording surface of the magnetic disk is divided into, for example, about 10 to 30 zones in radial directions, and the control information is measured and administered for each zone. The control information table 48 of FIG. 5 representatively shows the measurement results of a particular zone. In the control information table 48, four levels of apparatus operating temperatures, a lower limit temperature TLL, a low temperature TL, a normal temperature TN, and a high temperature TH are set as apparatus operating temperatures, so as to obtain the measurement results of the control information. As the head numbers, when the head numbers of the heads are HH1 to HH4 since the four heads 22-1 to 22-4 are used as shown in FIGS. 1A and 1B in this embodiment, the flying height control information table 48 has table contents corresponding to the head number HH1 of the magnetic head 22-1. As the flying heights, flying heights do1 to do4 which are measured upon positioning of the head to a particular measurement track in each zone when no electric power is distributed to the heater are stored. As the target flying height, a common read target flying height dp is stored in this example for all the apparatus operating temperatures, all the heads, and all the zones. The heater protrusion sensitivity is a head protrusion value of the heater per unit distributed electric power, and is measured from the measurement result of a protrusion value caused by electric power distribution to the heater of the head by using precise measurement equipment which measures micron-order displacement. The heater protrusion sensitivity is a value which is different depending on the apparatus operating temperature, and, in this example, e1 to e4 are stored as the heater protrusion sensitivity. Also, it goes without saying that the heater protrusion sensitivity has a value which is different in each head.

Figure 6:
FIG. 6 is an explanatory diagram of a heater set electric power table used in the present embodiment.

FIG. 6 is an explanatory diagram of the heater set electric power table 50 which is generated by the flying height information measurement unit 80 of FIG. 4. In FIG. 6, in the heater set electric power table 50, as the heater set electric power for each apparatus operating temperature, three types of electric power, i.e., read heat electric power Pr, write heat electric power Pw, and preheat electric power Pp are set. The read heater electric power Pr, the write heater electric power Pw, and the preheat electric power Pp can be respectively calculated by the following expressions based on the flying height d0 upon no electric power distribution, the target flying height dp, and the heater protrusion sensitivity e of the flying height control information table 48 of FIG. 5.

$$Pr = (do - dp)/e \quad (1)$$

$$Pw = (do - dp - dw)/e \quad (2)$$

$$Pp = (do - dp)/e \quad (3)$$

Herein, the read heat electric power Pr and the preheat electric power Pp is the same electric power. Since there is self-heating which is caused when a recording current is caused to flow upon a write by the recording element, the write heater electric power Pw is calculated by additionally subtracting the recording current protrusion value dw of FIG. 5 caused by the self-heating from the flying height do, and it is electric power which is lower than the read heat electric power Pr and the preheat electric power Pp, which are the same electric power, by the electric power amount (dw/e) corresponding to the recording current protrusion value dw.

FIG. 7 is an explanatory diagram of the preheat sector number administration table 52 measured by the preheat sector number measurement unit 82 of FIG. 4. The preheat sector number administration table 52 stores preheat sector numbers C respectively for the apparatus operating temperatures separately for the head numbers HH1 to HH4. Herein, in the control information table 48, the heater set electric power table 50, and the preheat sector number administration table 52 of FIG. 5, FIG. 6, and FIG. 7, the measurement results of the control parameters are respectively stored for the four levels of temperatures serving as the apparatus operating temperatures; and the temperatures between the apparatus operating temperatures in the table are obtained by corresponding control parameters by imputation calculations. Each of the control information table 48, the heater set electric power table 50, and the preheat sector number table 52 of FIG. 5, FIG. 6, and FIG. 7 is required to be generated/registered by separating itself by at least any one of the heads, the zones of the recording medium, and the operating temperatures of the apparatus. Upon organization in an examination process or the like in a plant, the preheat sector number measurement unit 82 of FIG. 4 measures the preheat sector number corresponding to transition time from start of electric power distribution to and heating of the heater by the predetermined preheat electric power Pp, which is obtained from the heater set electric power table 50 shown in FIG. 6, until it is stabilized to the predetermined target flying height. Specifically, a process by the first mode measurement processing unit 84 and a process by the second mode measurement processing unit 86 are executed. In the state that positioning to an arbitrary measurement track of the magnetic disk is achieved, while electric power is distributed to the heater to heat it by the preheat electric power Pp from an index which is a rotation reference position serving as a starting point, the first mode measurement processing unit 84 writes test data over one track by the recording element, and then reads the test data by the reading element, thereby measuring a predetermined evaluation value as a threshold value. The second mode measurement processing unit 86 starts electric power distribution and heating of the heater by the preheat electric power Pp by using the index, which is the rotation reference position, as a starting point, and sequentially writes and reads the test data to and from each of the sectors on the measurement track, thereby measuring the evaluation value in the order of the sectors; and, when the sector that satisfies the evaluation threshold value measured by the first mode measurement processing unit 84 is determined, the second mode measurement processing unit determines the number of the sectors up to the determined sector as the preheat sector number. As the evaluation value which is measured by the first mode measurement processing unit 84 and the second mode measurement processing unit 86 in the present embodiment and based on the test data reading, either (1) error rate or (2) signal quality monitoring value is used.

The signal quality monitoring value is measured by the quality monitoring unit 92 of the read channel 42, which is provided in the control board 12 of FIGS. 1A and 1B. The signal quality monitoring value measured by the quality monitoring unit 92 is, for example, square mean error MSE (Mean Square Error) based on the read data or Viterbi metric margin VMM (Viterbi Metric Margin); and, other than these, an arbitrary value can be used as long as the value is correlated with the signal quality. Upon reproduction or recording, the flying height control unit 46 provided in the MPU 26 of FIG. 4 distributes electric power to the heater from a sector position which is before the target sector by the preheat sector number obtained from the preheat sector number administration table 52 so as to perform preliminary heating, and then controls the flying height of the head to the predetermined target flying height from the target sector position. Specifically, the write flying height control unit 88 and the read flying height control unit 90 are provided. The write flying height control unit 88 distributes the preheat electric power Pp to the heater from the sector position, which is before the target sector by the preheat sector number so as to perform preliminary heating, switches that to the write heat electric power Pw for control to a write target clearance and performs recording when it reaches the target sector, and stops heater electric power distribution at a next sector position after the recording is finished. The read flying height control unit 90 distributes the predetermined preheat electric power Pp to the heater from the sector position, which is before the target sector by the preheat sector number, so as to perform preliminary heating, switches that to the read heat electric power Pr for control to a predetermined read target clearance and performs read when it reaches the target sector, and stops the heater electric power distribution at a next sector position after the reading is finished. Herein, since the preheat electric power Pp and the read heat electric power Pr is the same, when it reaches the target sector, the preheat electric power Pp is maintained as the read heat electric power without change.

Figure 8:
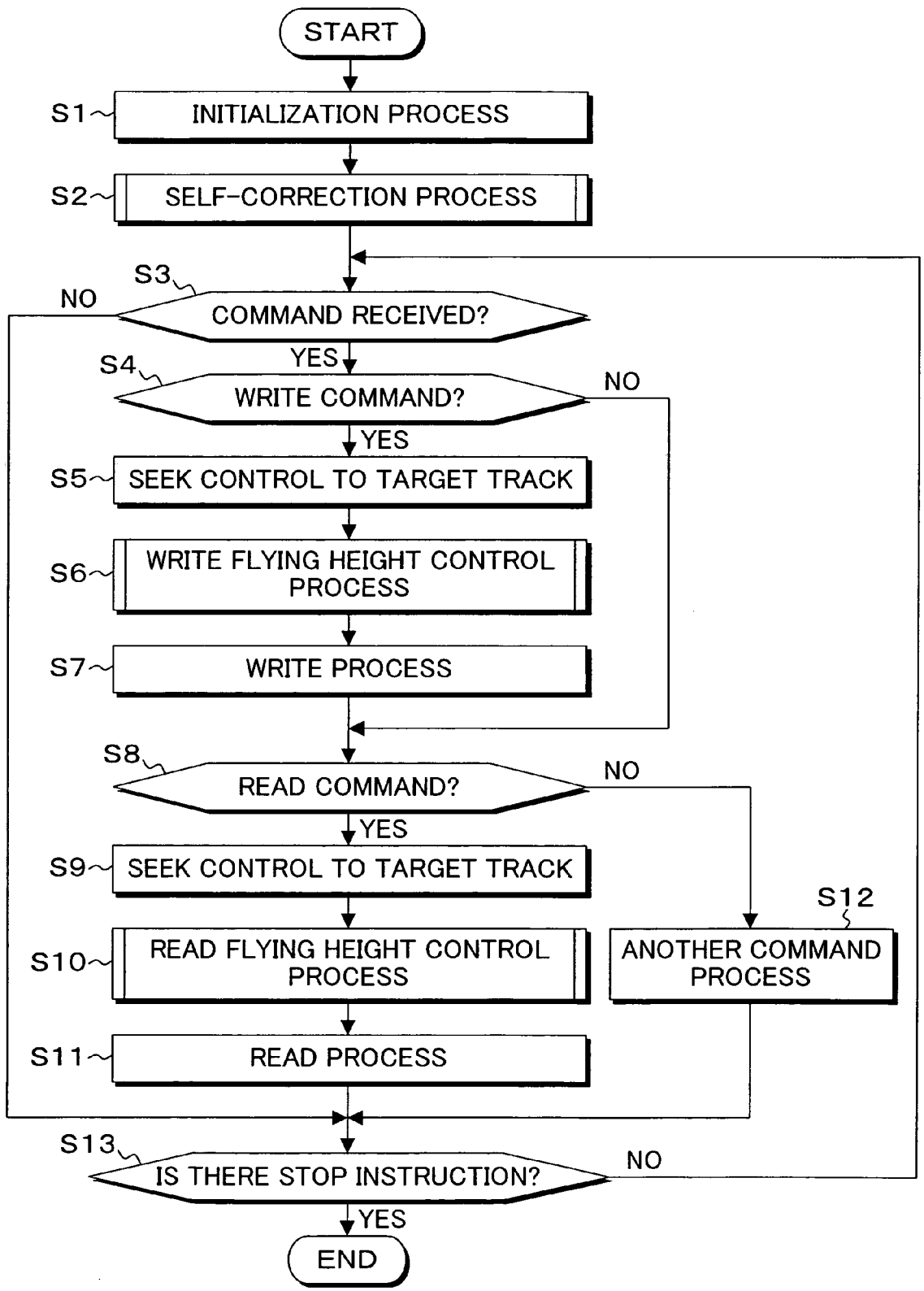
FIG. 8 is a flow chart of an overall processing operation of the present embodiment.

FIG. 8 is a flow chart of an overall processing operation in the magnetic disk apparatus of the present embodiment. In FIG. 8, when the power of the magnetic disk apparatus is turned on, an initialization process is performed in step S1, and a self-correction process is executed in step S2. One of the processing items of the self-correction process includes the measurement process performed by the preheat sector number measurement unit 82 shown in FIG. 4. Note that, since the control information measurement process including the measurement process of the preheat starting timing sector number is a process which is performed while the apparatus temperature is varied in an examination process of a plant, the measurement process is performed by downloading firmware, which is dedicated to the examination process, to the magnetic disk apparatus; and the firmware is deleted after the control information table 48, the heater set electric power table 50, and the preheat sector number administration table 52 are generated by the measurement process. Next, command reception from the host is checked in step S3; and, when a command is received, the process proceeds to step S4 wherein whether it is a write command or not is determined. If it is a write command, seek control to a target track based on command decoding is performed in step S5. Subsequently, in step S6, an on-track state in which the head is positioned to the target track is attained, and a write flying height control process is executed; and, in the state in which the flying height of the recording element with respect to the magnetic disk is controlled to a target flying height, a write process is executed in step S7. If it is not a write command in step S4, whether it is a read command or not is determined in step S8. If it is a read command, seek control to a target track by command decoding is performed in step S9, and then a read flying height control process of step S10 is executed in the state in which the head is positioned to the target track. If there is no read command in step S8, another command process is executed in step S12. Such processes of steps S3 to S12 are repeated until there is a stop instruction of the apparatus in step S13.

Figure 9:
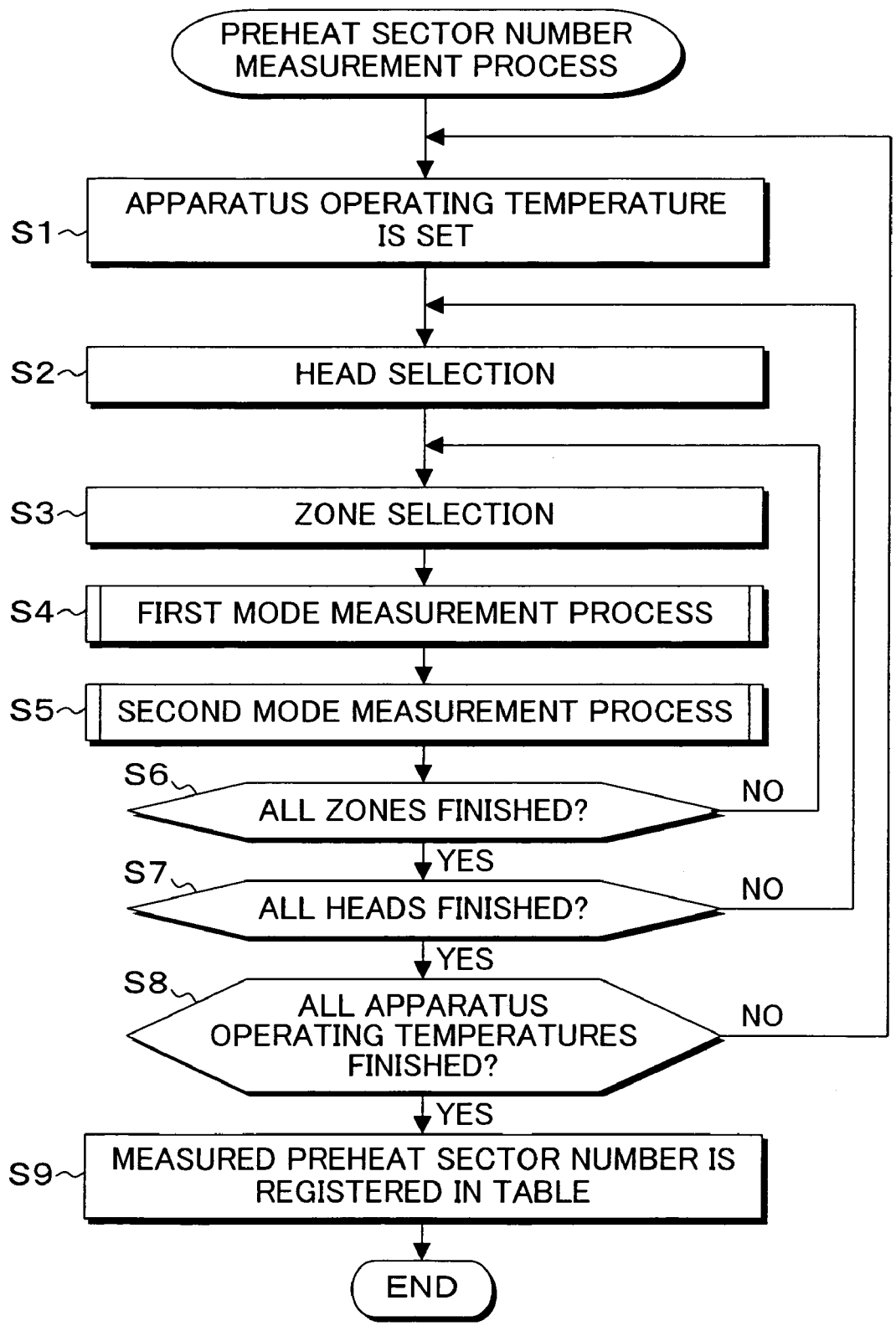
FIG. 9 is a flow chart showing details of a preheat sector number measurement process according to the present embodiment.

FIG. 9 is a flow chart showing details of the preheat sector number measurement process according to the present embodiment. In FIG. 9, in the preheat sector number measurement process, apparatus operating temperatures are set in step S1. The apparatus operating temperatures are set over four levels, the lower-limit temperature TVL, the low temperature TL, the normal temperature TN, and the high temperature TH for example as shown in the tables of FIG. 5 to FIG. 7. Subsequently, a head is selected in step S2. Since the four heads are used in the present embodiment, one of them is selected. Subsequently, a zone is selected in step S3. The zones of the magnetic disk are, for example, ten zones, and a top zone is selected. Next, a first mode measurement process is executed in step S4. Subsequently, a second mode measurement process is executed in step S5, and the preheat sector number corresponding to the apparatus operating temperature, the head, and the zone at this point is determined. Subsequently, whether all the zones are finished or not is checked in step S6, and, if unfinished, the process from step S3 is repeated. When all the zones are finished, whether all the heads are finished or not is checked in step S7, and, if unfinished, the process from step S2 is repeated. When all the heads are finished, whether all the apparatus operating temperatures are finished or not is checked in step S8, and, if unfinished, the process from step S1 is repeated. When all the apparatus operating temperatures are determined to be finished in step S8, the measured preheat sector numbers are registered in the preheat sector number administration table 52 as shown in FIG. 7. The preheat sector number administration table which is obtained in this manner through the preheat sector number measurement process is stored in the non-volatile memory 32 or the system areas of the magnetic disks 20-1 to 20-2 together with other control parameter tables, and the table is read to the memory 30 so as to be used upon apparatus activation thereafter.

Figure 10A:
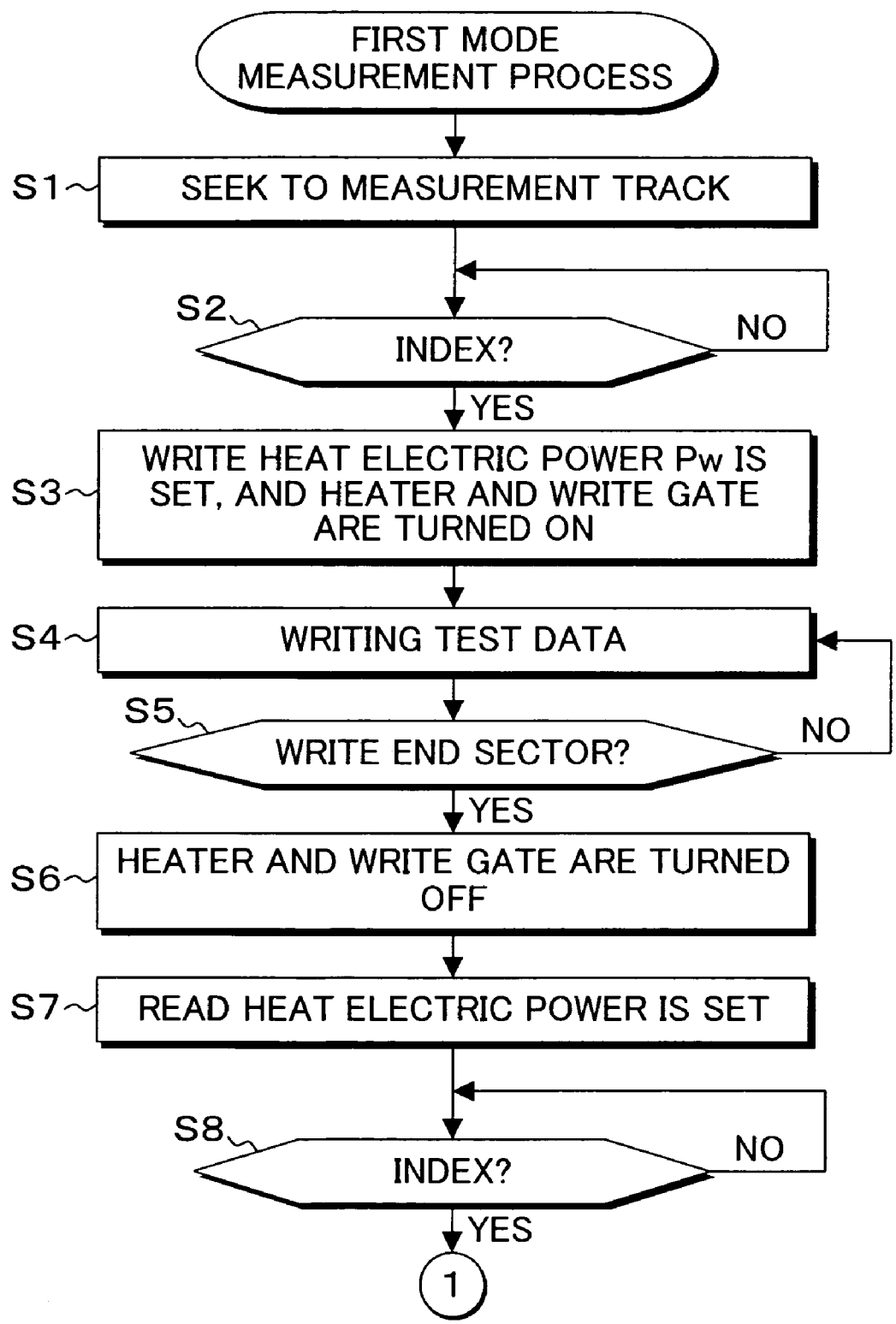
FIGS. 10A and 10B are flow charts showing details of the first mode measurement process of step S4 of FIG. 9 using error rate.
Figure 10B:
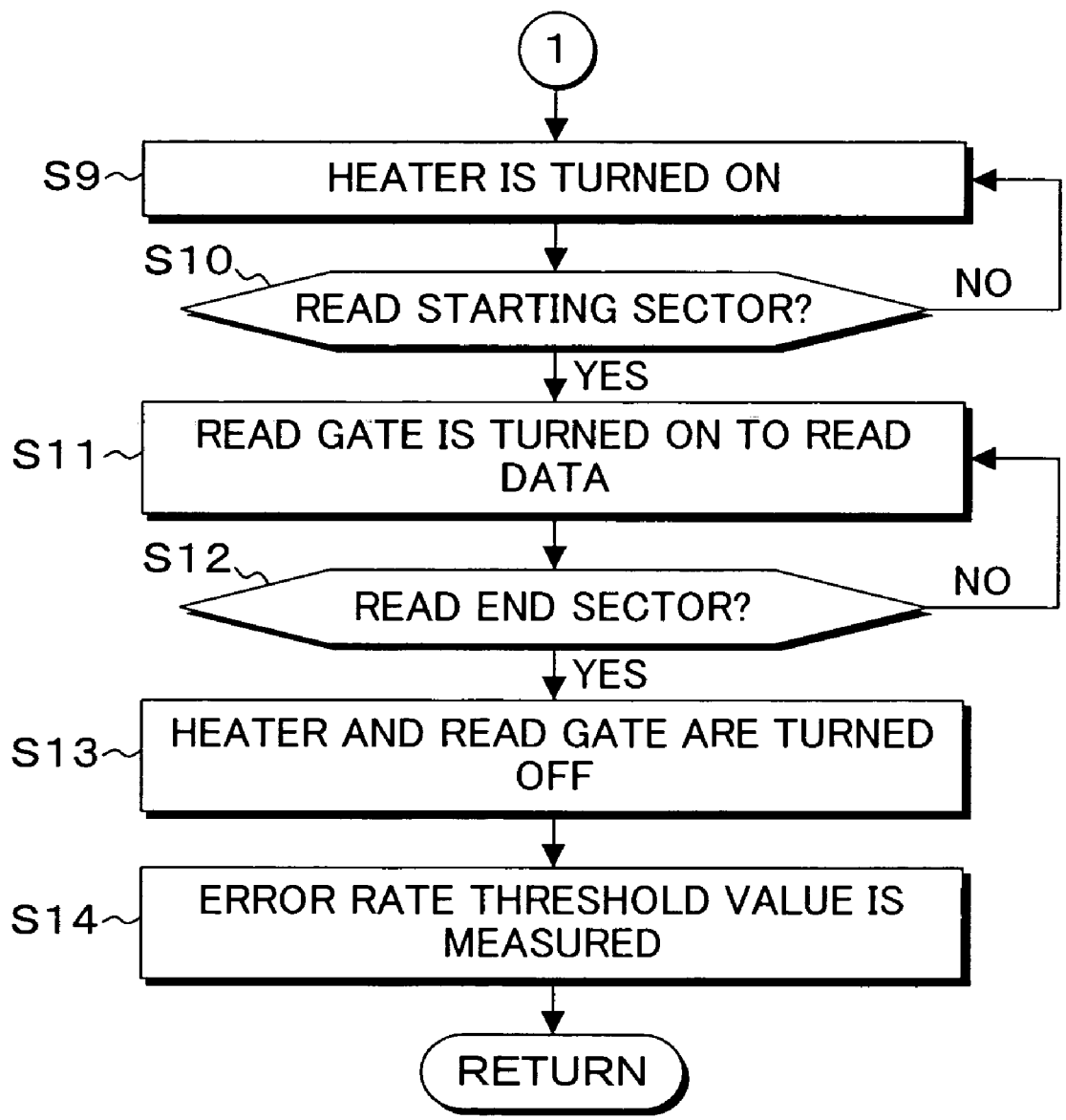

FIGS. 10A and 10B are flow charts showing details of the first mode measurement process of step S4 of FIG. 9. In the first mode measurement process of FIGS. 10A and 10B, first of all, seek to a measurement track is performed in step S1, and then an index indicating a rotation reference position of the magnetic disk is awaited in step S2. When the index is determined in step S2, the process proceeds to step S3, wherein the write heat electric power Pw acquired from the heater set electric power table 50 of FIG. 6 is set, the heater is turned on to perform electric power distribution and heating, and the heater is turned on to perform electric power distribution and heating at the same time when a write gate is turned on; and test data is written over one track in step S4. When reach to a write end sector such as a predetermined final sector is determined in step S5, the heater and the write gate are turned off in step S6. Subsequently, in step S7, the read heat electric power Pr which is acquired from the heater set electric power table 50 of FIG. 6 is set. Subsequently, presence of an index which serves as a next rotation starting position is checked in step S8, and, when the index is determined, the process proceeds to step S9, wherein the heater is turned on. Subsequently, in step S10, whether it is a read starting sector or not is determined. As the read starting sector, in the present embodiment, since read of the latter half of the one track where the expansion/heating of the head in the write of the test data in the heater electric power distributed state in step S4 is stabilized is performed, a sector in the vicinity of the center of the one track is used as the read starting sector. When the read starting sector is determined in step S10, the process proceeds to step S11, wherein a read gate is turned on, and the test data is read. Subsequently, when the read end sector at which a final sector is set is determined in step S12, the heater and the read gate are turned off in step S13. Finally, in step S14, an error rate is measured based on the test data read in step S11, and this is used as the error rate threshold value.

FIGS. 11A to 11D are timing charts showing the processing operation of the first mode measurement process of FIGS. 10A and 10B. FIG. 11A shows indexes, FIG. 11B shows heater control, FIG. 11C shows the write gate, and FIG. 11D shows the read gate. In the first mode measurement process, when the index 94-1 is detected at time t1, the write gate is turned on, the write heat electric power Pw is set by the heater control synchronized with the write gate, the heater is turned on, and test data is written over one track while leaving a final sector unwritten. When the next index 94-2 is obtained, the read heat electric power Pr is set, the heater is turned on, the read gate is subsequently turned on when it reaches the starting sector representing a latter half starting position of the one rotation, and the test data is read from the remaining sectors. When the index 94-3 is obtained at time t3, the process is terminated, an error rate is measured from the test data, and the error rate is used as the error rate threshold value.

Figure 12A:
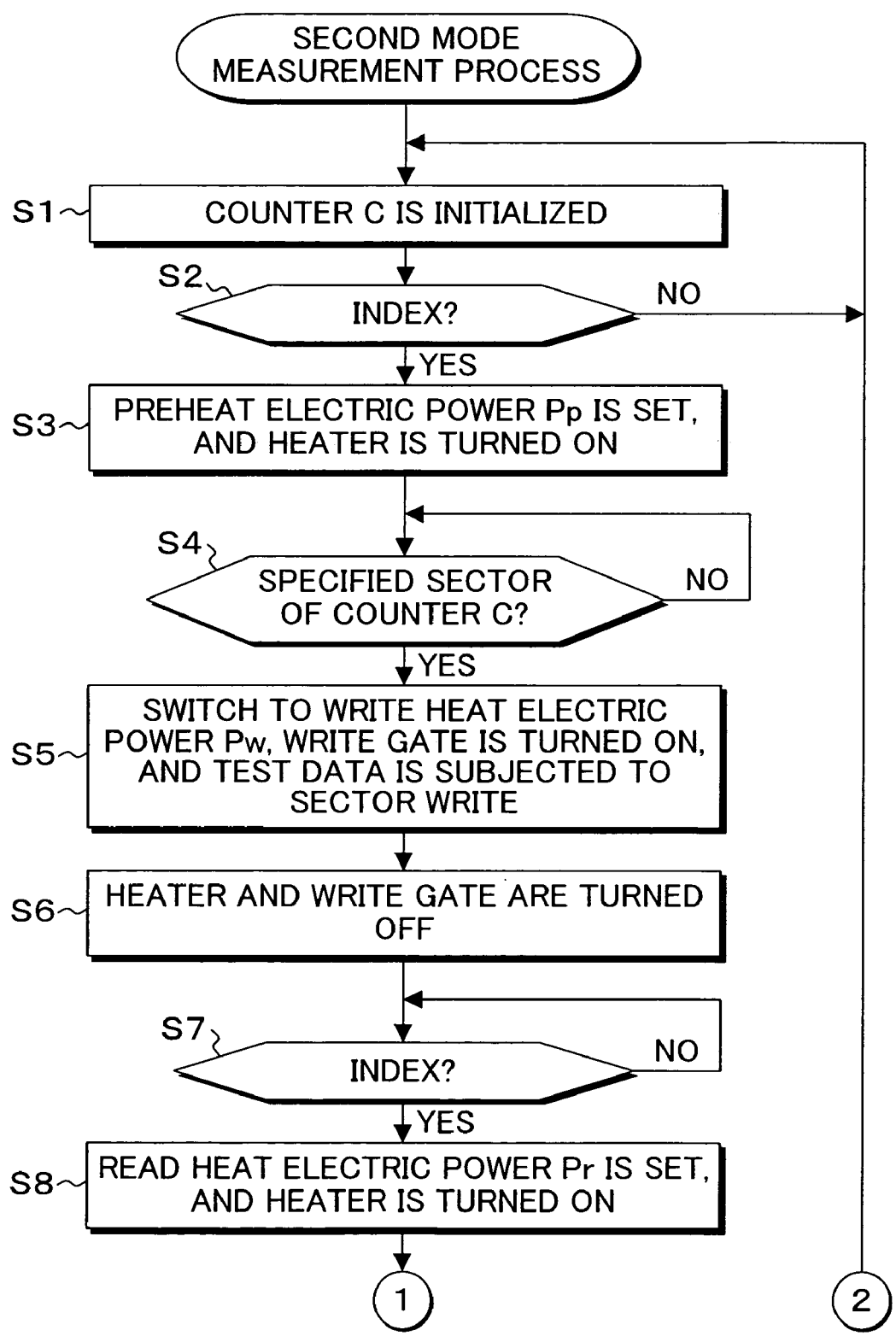
FIGS. 12A and 12B are flow charts showing details of the second mode measurement process of step S5 of FIG. 9 using error rate.
Figure 12B:
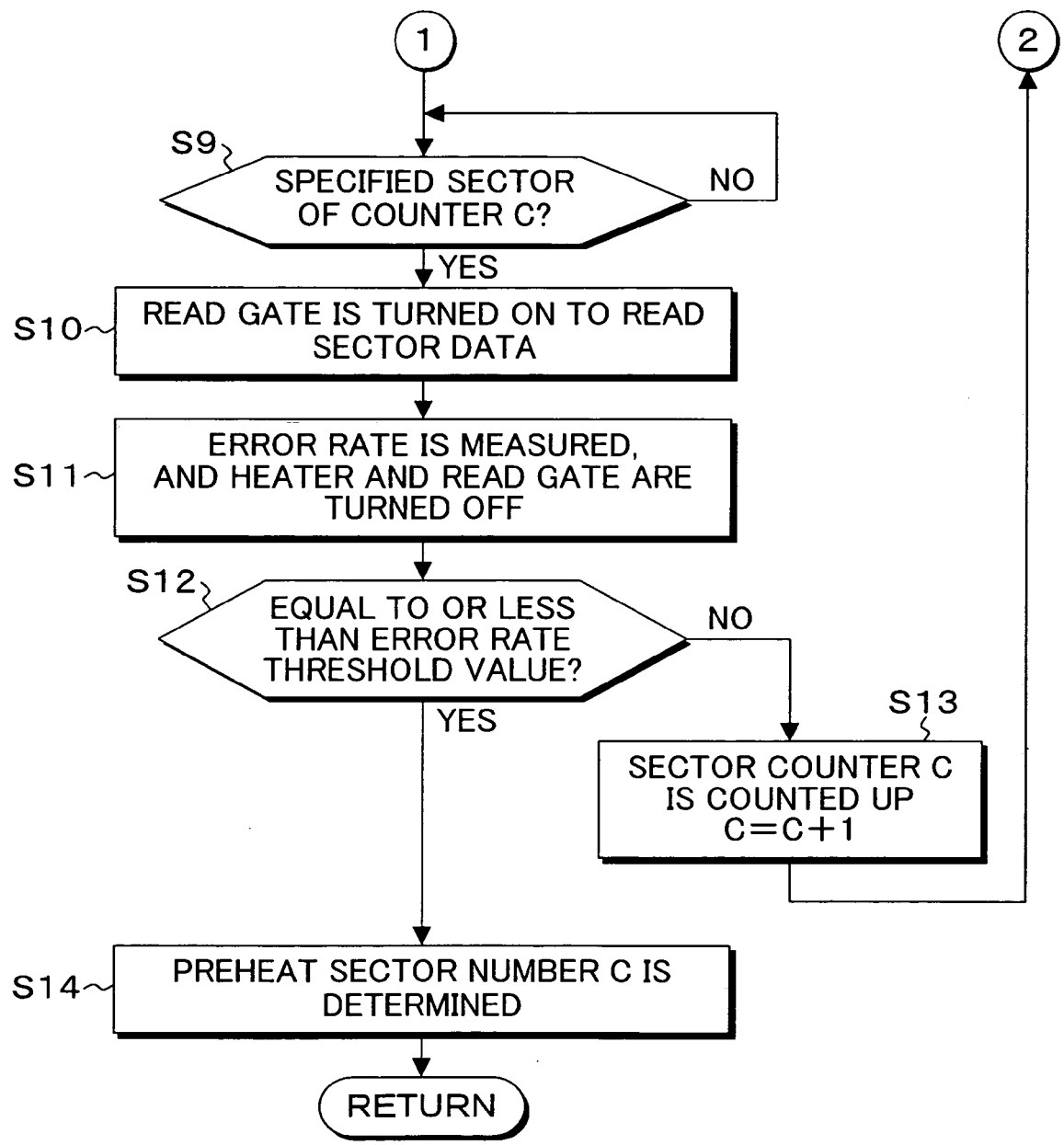

FIGS. 12A and 12B are flow charts showing details of the second mode measurement process in the present embodiment. In FIGS. 12A and 12B, in the second mode measurement process, a counter C which counts the sector number is initialized to C=1 in step S1, and an index is awaited in step S2. When the index is determined in step S2, the process proceeds to step S3, wherein the heater is turned on in the state in which the preheat electric power Pp acquired from the heater set electric power table 50 of FIG. 6, and whether it is a specified sector of the counter C or not is checked in step S4. Since the specified sector of the counter C at this point is a first sector which is C=1, when it reaches the first sector, the process proceeds to step S5, wherein the electric power to the heater is switched to the write heat electric power Pw acquired from the heater set electric power table 50 of FIG. 6, and the write gate is turned on to write the test data to the sector. When the write is finished in next step S6, the heater and the write gate are turned off. Note that, in the first sector, the preheat electric power is not supplied to the heater, and heater electric power distribution by the write heat electric power Pw after the switch is performed in synchronization with the write gate. Next, the next index is awaited in step S7. When the index is determined, the process proceeds to step S8, wherein read heat electric power Pr acquired from the heater set electric power table 50 of FIG. 6 is set, and the heater is turned on. Subsequently, in step S9, whether it is the specified sector C=1 of the counter C or not is checked. When the counter C=1, that is, the first sector is determined in step S9, the process proceeds to step S10, wherein the read gate is turned on, and the sector data is read. In step S11, an error rate C1 of the first sector specified by the counter C is calculated, and the heater and the read gate are turned off. Subsequently, the process proceeds to step S12, in which whether the error rate calculated in step S11 is equal to or less than the error rate threshold value measured by the first mode measurement unit is determined. At a first sector which is close to the index from which the heater electric power distribution is started, since the heating and expansion caused by the heater electric power distribution is not saturated, the flying height has not reached the target flying height, and the error rate is in the state that it is larger than the error rate threshold value. In this case, the counter C is counted up to C=C+1 in step S13, and the process returns to step S2, in which a next index is awaited, and an error rate is measured by performing write and read of the test data for a second sector specified by the counter C. In the second sector, the counter C which counts the sector number is initialized to C=1 in step S1. When the index is determined in step S2, the process proceeds to step S3, in which the heater is turned on in the state in which the preheat electric power Pp acquired from the heater set electric power table 50 of FIG. 6 is set, and whether it is the specified sector of the counter C or not is checked in step S4. Since the specified sector of the counter C at this point is C=2 which is the first sector, when it reaches the first sector, the process proceeds to step S5, in which the electric power to the heater is switched to the write heat electric power Pw acquired from the heater set electric power table 50 of FIG. 6, and the write gate is turned on to write the test data to the sector. When the write is finished in next step S6, the heater and the write gate are turned off. Subsequently, by the processes of steps S7 to S12, the data of the second sector is read so as to measure an error rate, and it is compared with the error rate threshold value. When the error rates are measured in this manner by writing and reading the test data in the order of the sectors of the measurement track, the error rate measured in step S12 becomes equal to or less than the error rate threshold value, and, at this point, the process proceeds to step S14, in which the value of the counter C representing the sector at which it is equal to or less than the error rate threshold value is determined as the preheat sector number C.

FIGS. 13A to 13D are time charts showing the processing operation of the second mode measurement process of FIGS. 12A and 12B, wherein FIG. 13A shows indexes, FIG. 13B shows heater control, FIG. 13C shows the write gate, and FIG. 13D shows the read gate. In the second mode measurement process of FIG. 13A to 13D, first of all, when the index 94-1 is obtained, the write gate for writing the test data to the first sector is turned on over one sector at this point, and the write heat electric power Pw is set to turn on the heater in synchronization with the write gate. Note that preheating is not performed in the first sector. Subsequently, when the next index 94-2 is obtained at time t2, the read heat electric power Pr is set, and the heater is turned on. At the same time, the read gate for reading the test data from the first sector to which the test data is written is turned on. Thus, an error rate can be measured for the first sector by reading the test data. Next, when the index 94-3 is obtained at time t3, the preheat electric power Pp is set, the heater is turned on, and the write gate is turned on at the timing of the second sector. In synchronization with this, the preheat electric power Pp until that point is switched to the write heat electric power Pr, and the test data is written. When a next index 94-4 is obtained, the read heat electric power Pr is set, and the heater is turned on. Also, at the timing of the second sector, the read gate is turned on to read the test data, and an error rate is measured for the second sector. Hereinafter, similarly, write and read of the test data is repeated sequentially for a third sector, a fourth sector, . . . , for each sector. The sector at which the measured error rate is equal to or less than the error rate threshold value obtained in the first mode measurement process is determined as the preheat sector number.

Figure 14A:
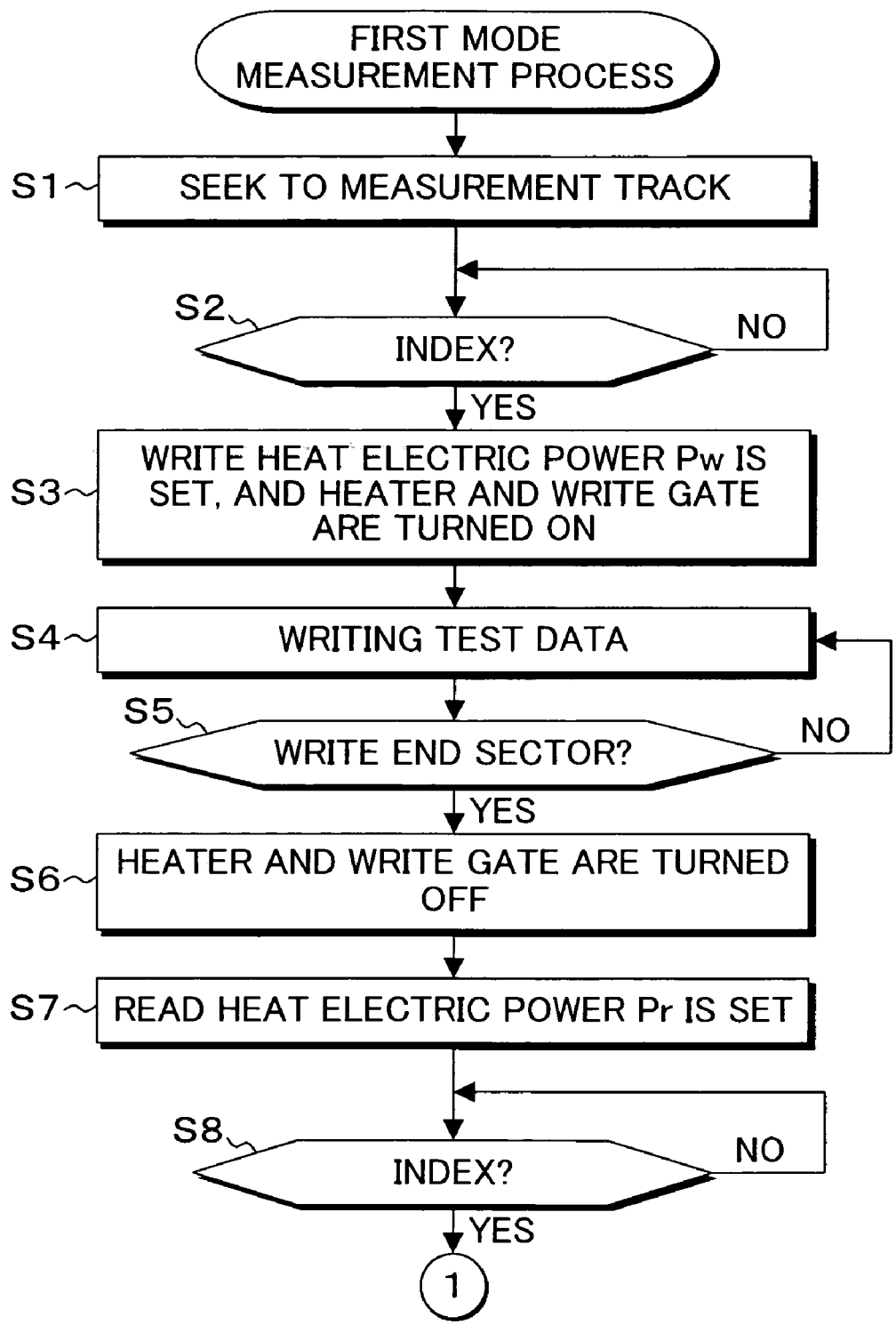
FIGS. 14A and 14B are flow charts showing details of the first mode measurement process of step S4 of FIG. 9 using signal quality monitoring value of a read channel.
Figure 14B:
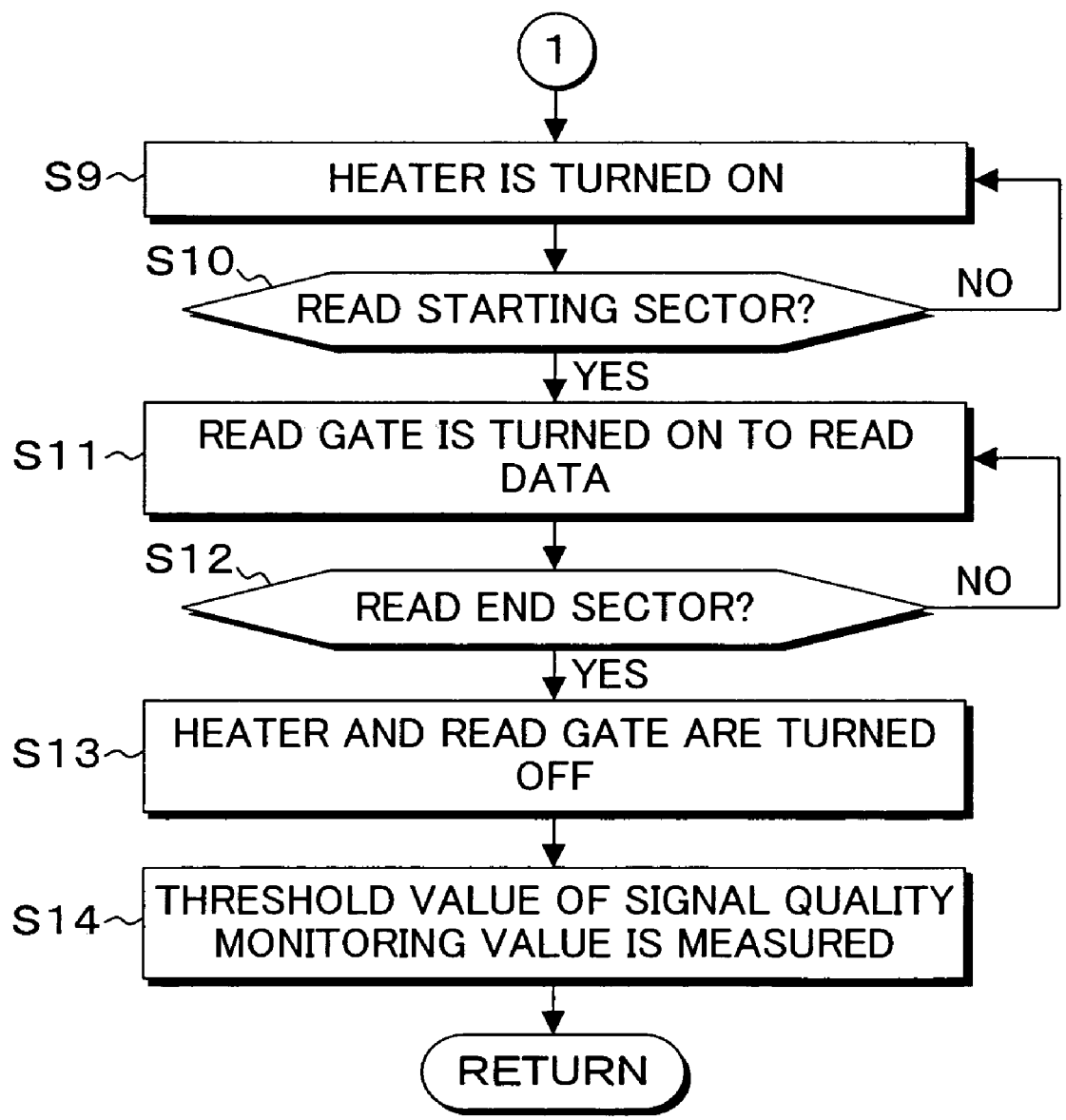

FIGS. 14A and 14B are flow charts of the first measurement process in the case in which a signal quality monitoring value obtained from the quality monitoring unit 92 provided in the read channel 42 of FIGS. 1A and 1B is used as the evaluation value for performing determination that it has reached the target clearance by protrusion of the head caused by heater electric power distribution and heating. The first mode measurement process is basically same as the first mode measurement process of FIGS. 10A and 10B in which the error rate is measured; and it is different in the point that the quality monitoring value is measured as the measurement in step S14, and it is used as a threshold value.

Figure 15A:
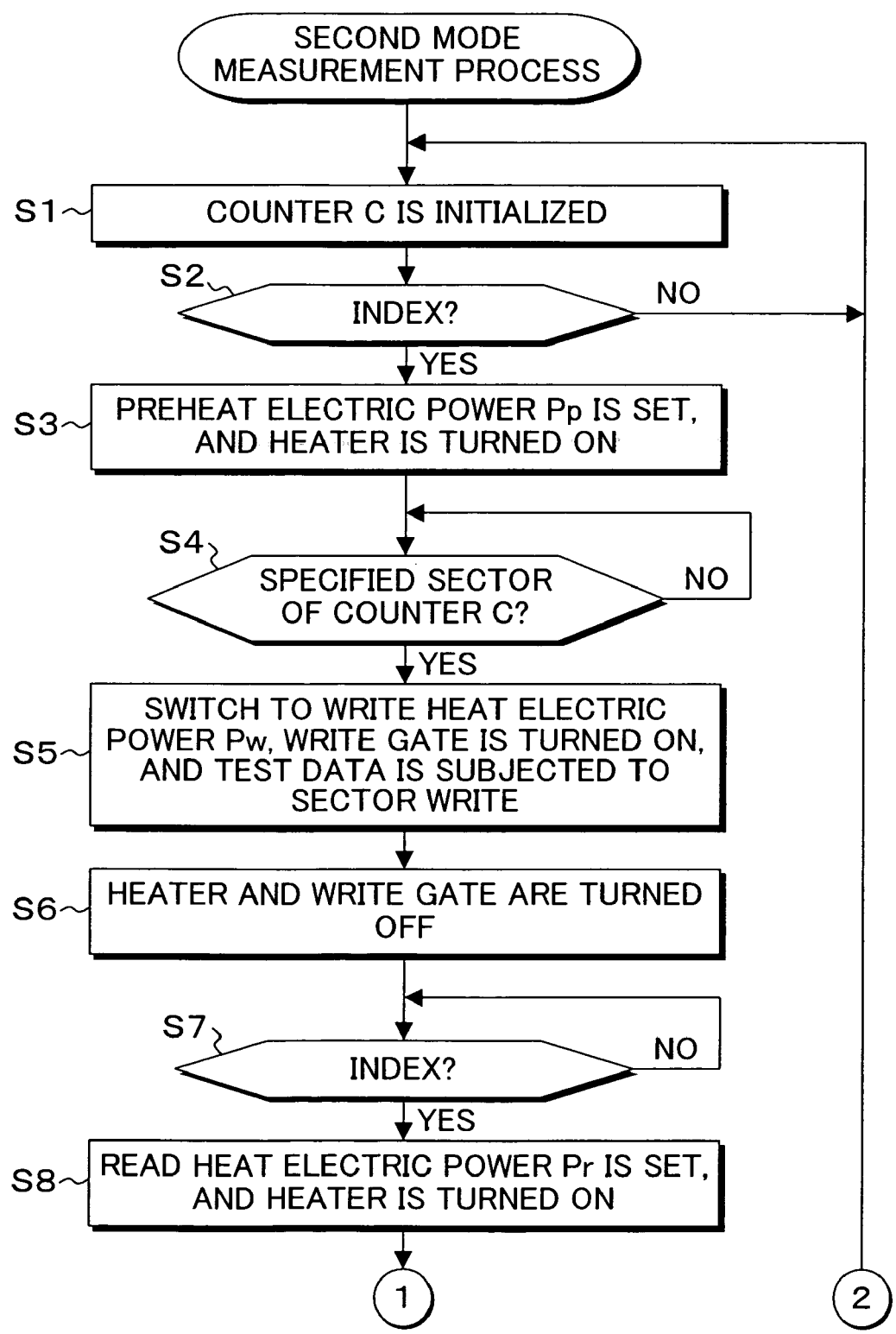
FIGS. 15A and 15B are flow charts showing details of the second mode measurement process of step S5 of FIG. 9 using the signal quality monitoring value of the read channel.
Figure 15B:
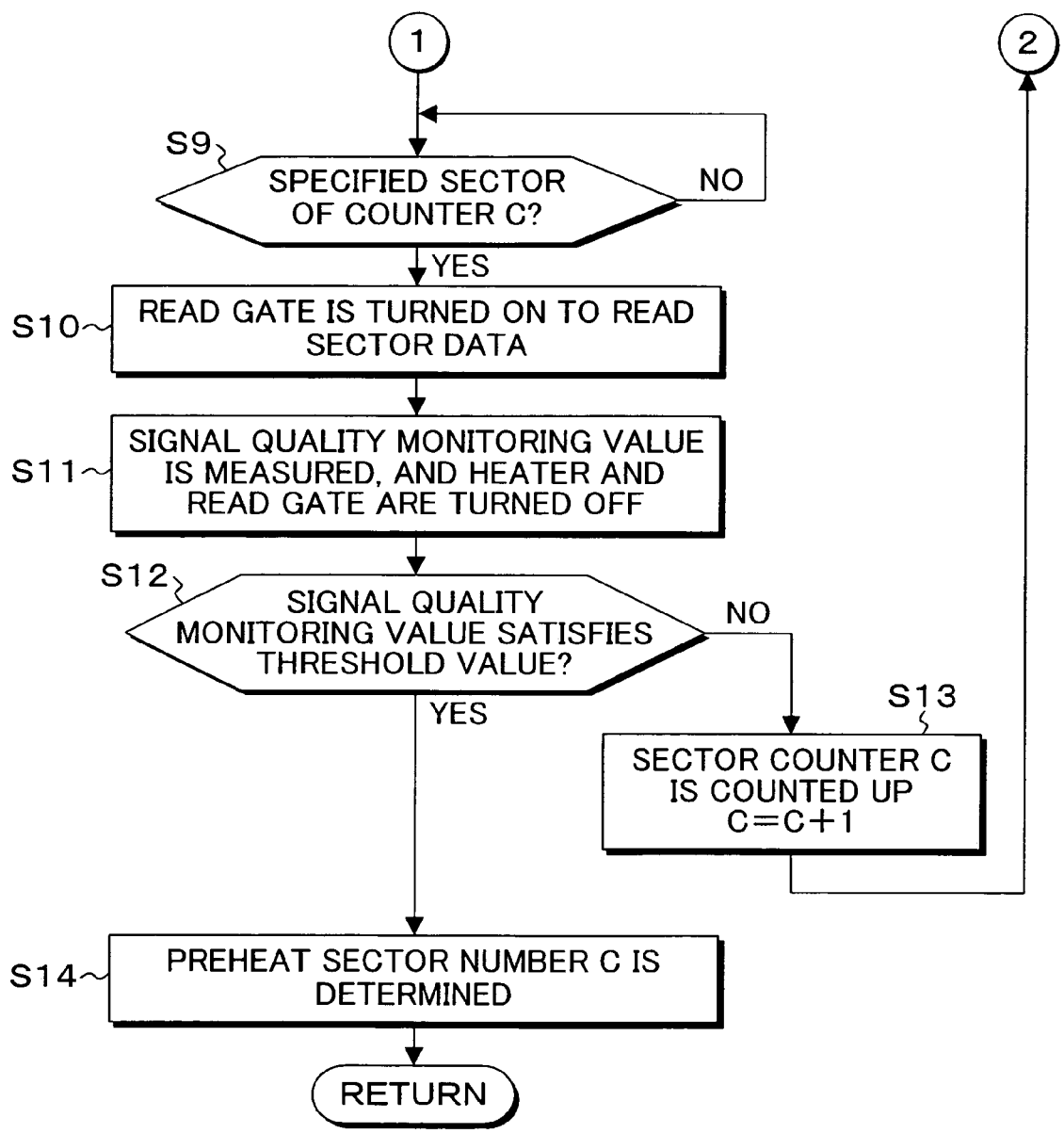

Also, FIGS. 15A and 15B are flow charts showing details of the second mode measurement process in which the signal quality monitoring value is similarly measured. The flow chart of the second mode measurement process is also same as the flow chart of the second mode measurement process shown in FIGS. 12A and 12B which measures the error rate, and it is different merely in the point that step S11 and step S12 are processes which use the signal quality monitoring value.

Figure 16:
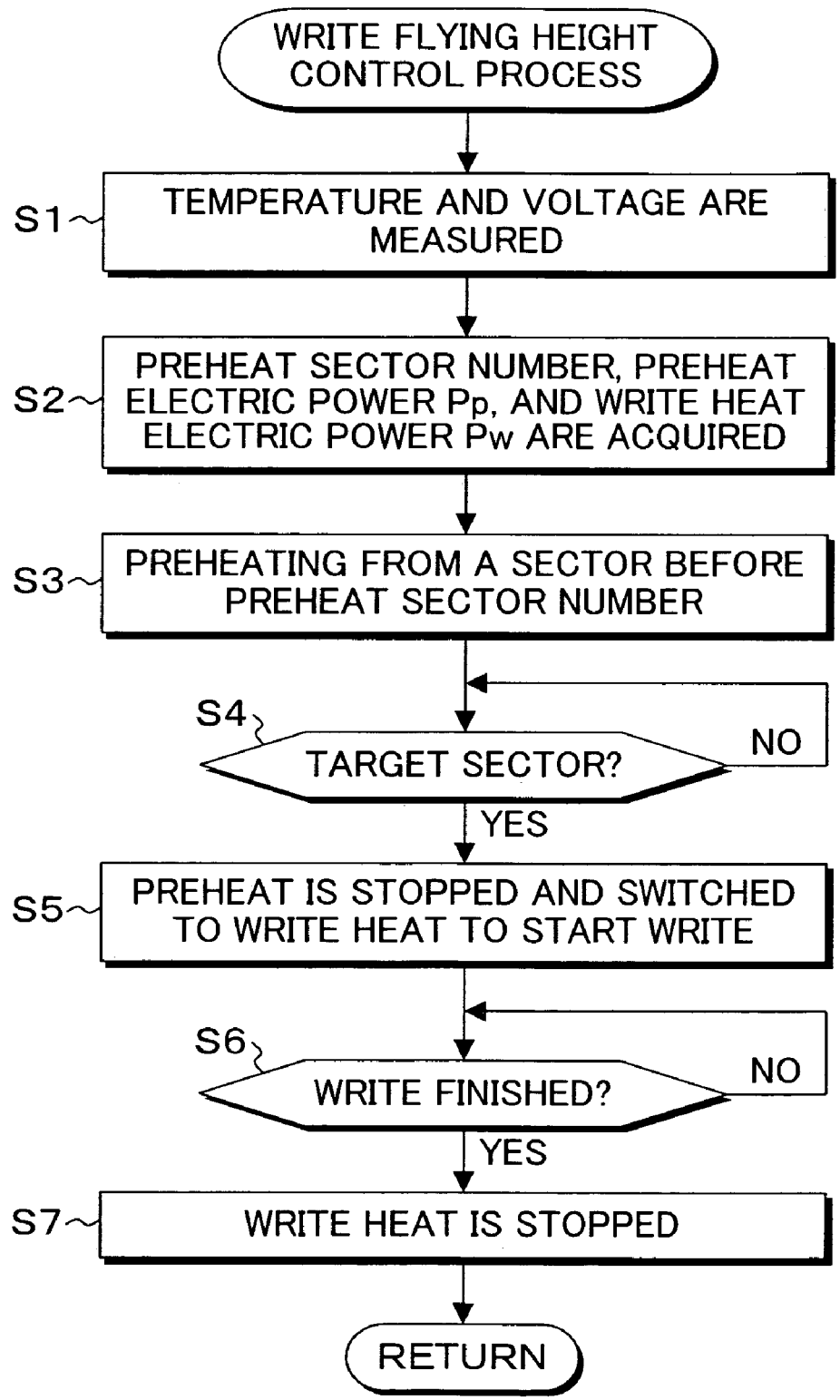
FIG. 16 is a flow chart showing details of the write flying height control process of step S6 of FIG. 8.

FIG. 16 is a flow chart showing details of the write flying height control process in step S6 of FIG. 8. First of all, the temperature and the voltage are measured in step S1; and, in step S2, the preheat sector number is acquired from the preheat sector number administration table 52 of FIG. 7, and the corresponding write heat electric power Pw and preheat electric power Pp is acquired from the heater set electric power table 50 of FIG. 6. Subsequently, in step S3, the preheat electric power Pp is supplied to the heater from a sector before a target frame by the preheat sector number so as to start preheating. In this preheating state, reach to the target sector is checked in step S4. When it reaches the target sector, in step S5, the preheating is stopped, and it is switched to the write heat electric power Pw so as to start write heat in which the electric power is distributed to the heater. When finish of the write is determined in step S6 in this state, the write heat is stopped in step S7. By virtue of such preheat and write heat, at the point when the target frame reaches the head, the head is controlled to a predetermined write flying height, and data write to the magnetic disk can be performed by an optimal flying height of the head and the magnetic disk.

Figure 17:
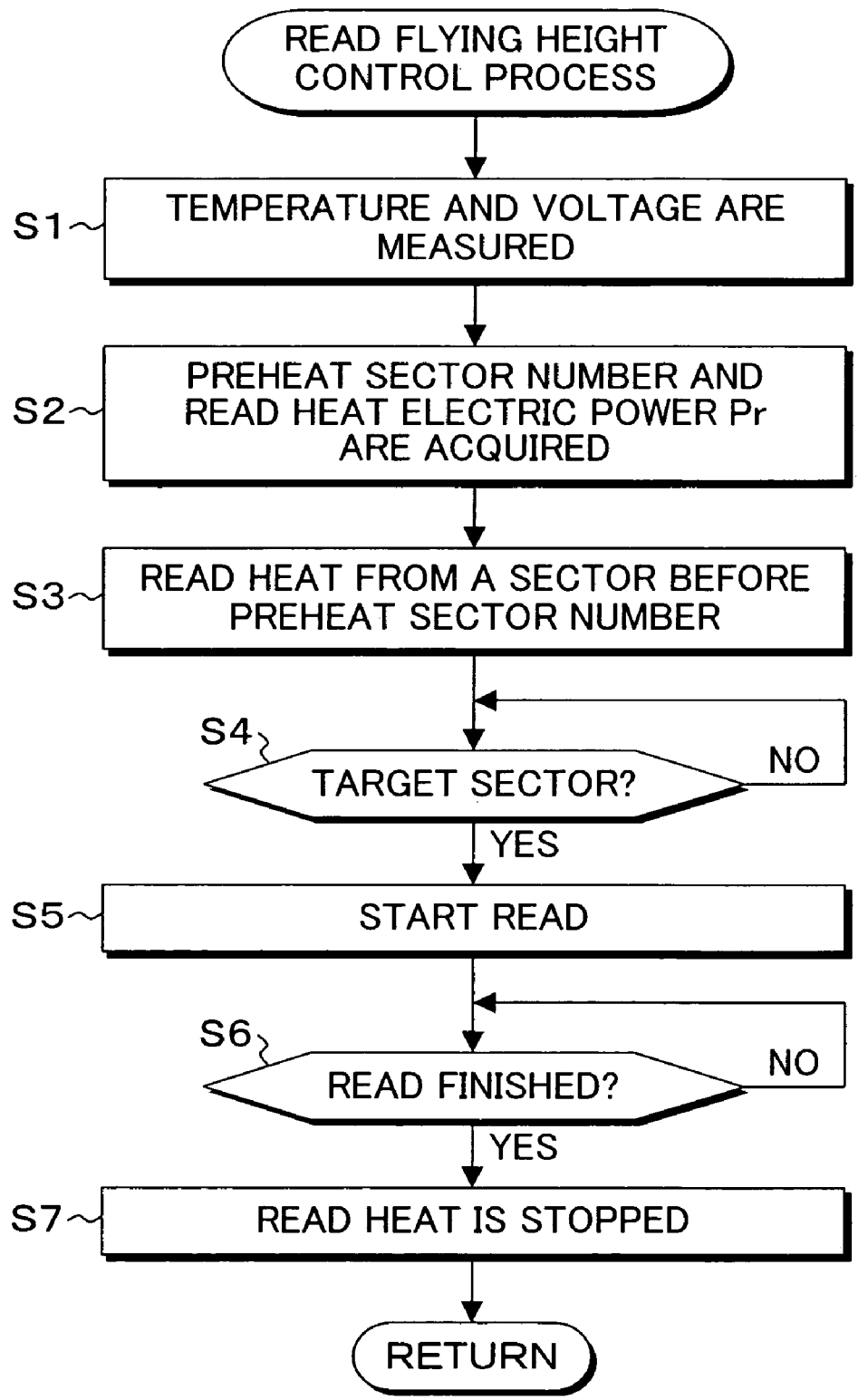
FIG. 17 is a flow chart showing details of the read flying height control process of step S10 of FIG. 8.

FIG. 17 is a flow chart showing details of the read flying height control process of step S10 of FIG. 8. First of all, the temperature and the voltage are measured in step S1; and then, in step S2, the preheat sector number is acquired from the preheat sector number administration table 52 of FIG. 7, and the corresponding read heat electric power Pr is read from the heater set electric power table 50 of FIG. 6. Next, in step S3, the read heat electric power Pr is supplied from a sector before the preheat sector number so as to start read heat. When reach to a target sector is determined in step S4 in this read heating state, read is started in step S5. Subsequently, when read completion is determined in step S6, the read heat is stopped in step S7. Herein, regarding a track of the magnetic disk, as is publicly known, one frame is composed of a servo area in which servo information is recorded and a data area subsequent to that and composed of a plurality of sectors, and one track is composed of, for example, 174 frames. In the present embodiment, the starting position of the preheat with respect to a target sector on a track is entirely administered by the sector number; however, it may be administered by a frame number. Specifically, the control may be performed such that a target flying height can be obtained from a tom part of a target sector by obtaining a preheat frame number from an integer which is obtained by dividing the preheat sector number measured by the preheat sector number measurement unit 82 by the sector number per one frame, starting preheat from a frame which is before the frame to which a target sector belongs by the preheat frame number, and switching it to the write heat electric power Pw when it reaches the target sector of the target frame.

Figure 18:
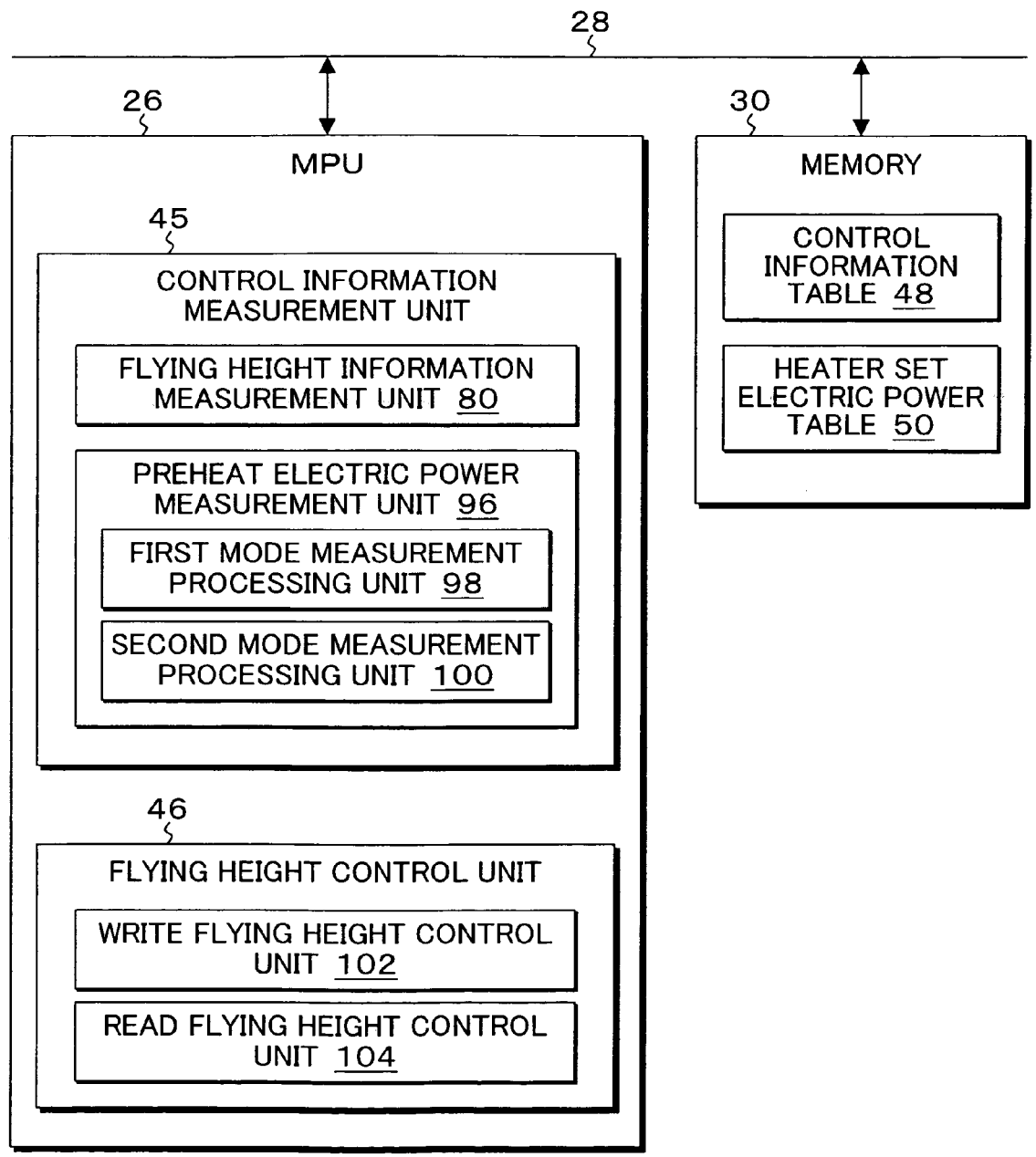
FIG. 18 is a block diagram showing another embodiment of the functional configuration of the MPU.

FIG. 18 is a block diagram showing details of a functional configuration of the MPU 26 in another embodiment of the present invention. The embodiment of FIG. 18 is characterized in that the preheat sector number to a target sector is set to a predetermined fixed value N, and, when it reaches the target sector (write top sector) by preheating up to the fixed preheat sector number N, an optimal value of the preheat electric power Pp by which an error rate equal to or less than the error rate threshold value is obtained is determined.

In FIG. 18, the flying height information measurement unit 80 and a preheat electric power measurement unit 96 are provided in the control information measurement unit 45 by the firmware of the MPU 26, and a first mode measurement processing unit 98 and a second mode measurement processing unit 100 are provided in the preheat electric power measurement unit 96. The flying height information measurement unit 80 is same as the embodiment of FIG. 4, and, corresponding to this, the control information table 48 and the heater set electric power table 50 in which measurement results are stored are provided in the memory 30. Furthermore, the flying height control unit 46 is provided in the MPU 26, and a write flying height control unit 102 and a read flying height control unit 104 are provided in the flying height control unit 46. Upon correction in an examination process or the like in a plant, the preheat electric power measurement unit 96 measures optimal preheat electric power which achieves stabilization to a predetermined target flying height when it has reached the target sector through electric power distribution and heating over the predetermined fixed preheat sector number N. Specifically, a process by the first mode measurement processing unit 98 and a process by the second mode measurement processing unit 100 are executed. In the state that positioning to an arbitrary measurement track of the magnetic disk is achieved, while electric power is distributed to the heater to heat it by the preheat electric power Pp from an index which is a rotation reference position serving as a starting point, the first mode measurement processing unit 98 writes test data over one track by the recording element, and then reads the test data by the reading element, thereby measuring a predetermined evaluation value as a threshold value. The second mode measurement processing unit 100 measures evaluation values by sequentially writing and reading the test data to or from a target sector (write top sector) which is next to the fixed preheat sector number N while varying the preheat electric power Pp, and determines the preheat electric power which satisfies the evaluation threshold value as optimal preheat electric power which is distributed over the fixed preheat sector number N. Herein, as the fixed preheat sector number N, for example when the number of frames of servo frames per one rotation of the magnetic disk is 174 frames, the sector number of several frames is used as the fixed preheat sector number N. As a matter of course, in order to reduce electric power consumption, the fixed preheat sector number is desired to be small as much as possible. As the evaluation value which is measured by the first mode measurement processing unit 98 and the second mode measurement processing unit 100 in the present embodiment and based on the test data reading, either (1) error rate or
(2) signal quality monitoring value is used.

The signal quality monitoring value is measured by the quality monitoring unit 92 of the read channel 42, which is provided in the control board 12 of FIGS. 1A and 1B. The signal quality monitoring value measured by the quality monitoring unit 92 is, for example, square mean error MSE (Mean Square Error) based on the read data or Viterbi metric margin VMM (Viterbi Metric Margin); and, other than these, an arbitrary value can be used as long as the value is correlated with the signal quality. Upon reproduction or recording, the flying height control unit 46 provided in the MPU 26 of FIG. 18 acquires preheat electric power, which is obtained from the heater set electric power administration table 50 from the sector, distributes electric power to the heater before the target sector by the fixed preheat sector number N so as to perform preliminary heating, and then controls the flying height of the head to a target flying height from a target sector position. Specifically, the write flying height control unit 102 and the read flying height control unit 104 are provided. The write flying height control unit 102 acquires and sets the optimal preheat electric power Pp, which is measured in advance by the preheat electric power measurement unit 96 for the heater, from the heater set electric power table 50, performs preliminary heating by distributing the optimal preheat electric power Pp to the heater from a sector position which is before the target sector by the fixed preheat sector number N, performs recording by switching that to the write heat electric power Pw for control to the write target clearance when it reaches the target sector, and stops heater electric power distribution at a next sector position after recording is finished. The read flying height control unit 104 acquires and sets the optimal preheat electric power Pp, which is measured in advance by the preheat electric power measurement unit 96, from the heater set electric power table 50 for the heater, performs preliminary heating by distributing the optimal preheat electric power Pp to the heater from a sector position which is before the target sector by the fixed preheat sector number N, performs read by switching that to the read heat electric power Pr for control to the predetermined read target clearance when it reaches the target sector, and stops heater electric power distribution at a next sector position after reading is finished.

Figure 19A:
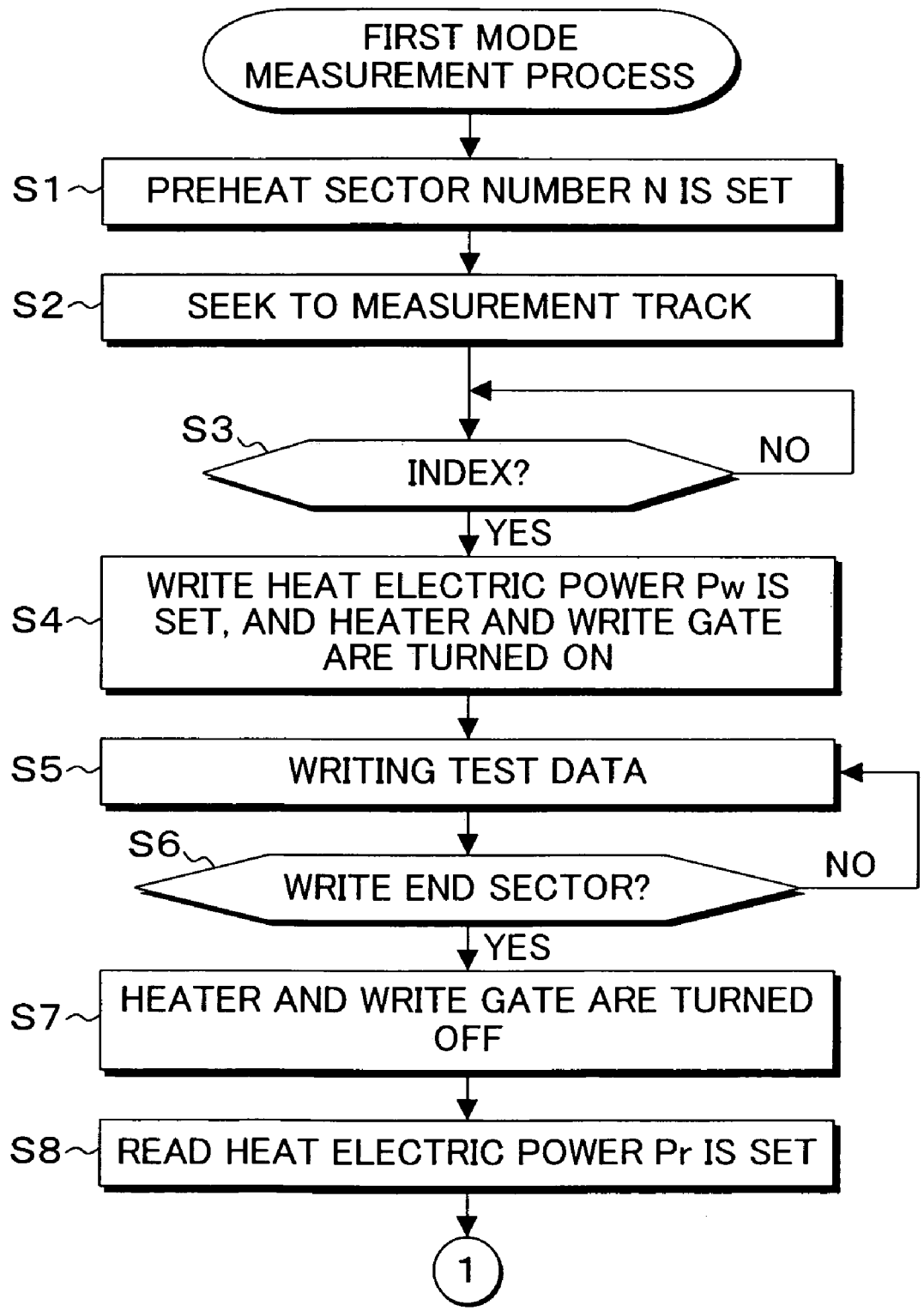
FIGS. 19A and 19B are flow charts showing a processing operation of the first mode measurement processing mode of FIG. 18 using error rate.
Figure 19B:
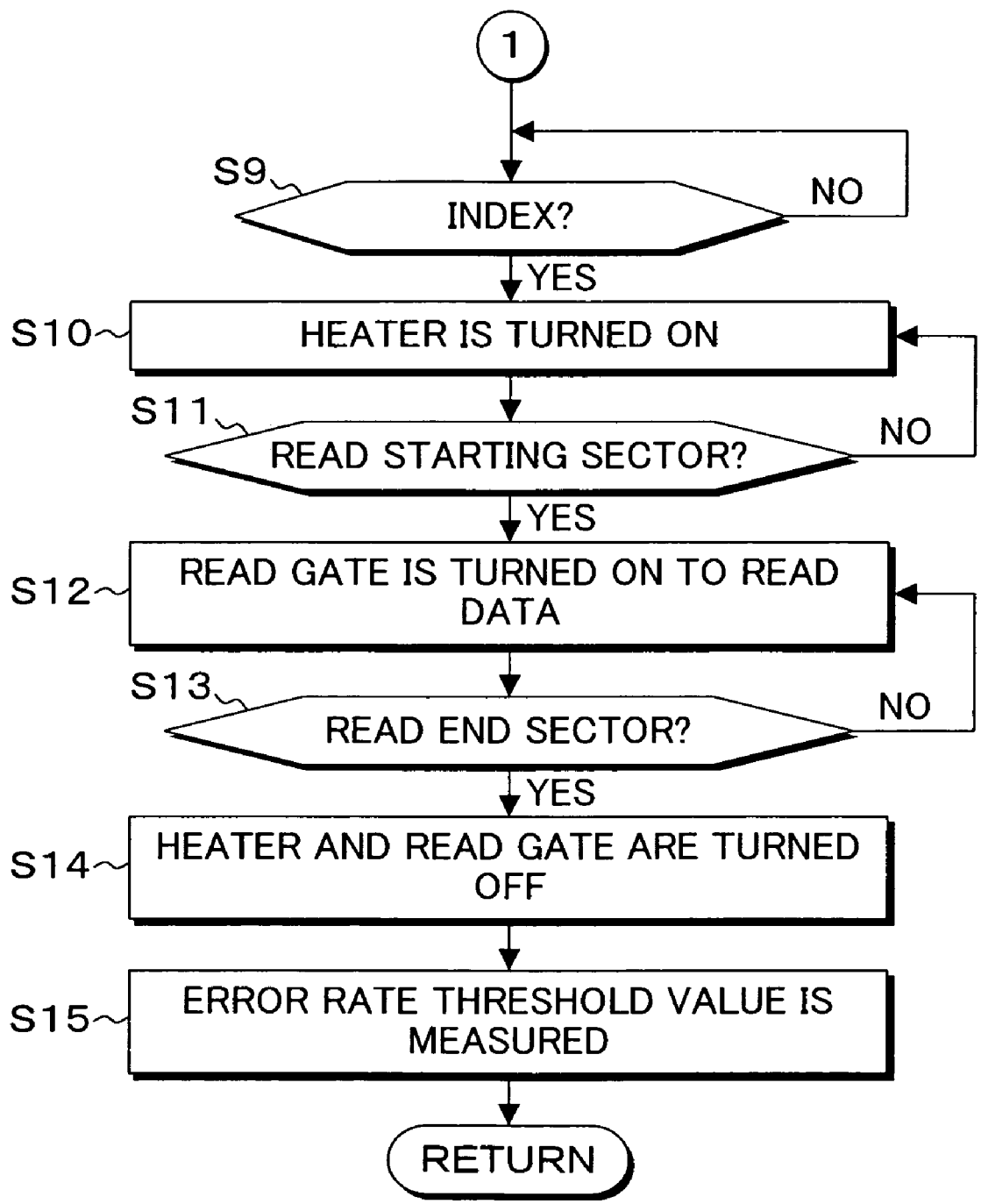

FIGS. 19A and 19B are flow charts showing details of the processing operation performed by the first mode measurement processing unit 98 of FIG. 18. In FIGS. 19A and 19B, the first mode measurement processing unit 98 of FIG. 18 sets the fixed preheat sector number N to a predetermined value, then seek to a measurement track is performed in step S2, and an index indicating a rotation reference position of the magnetic disk is awaited in step S3. When the index is determined in step S3, the process proceeds to step S4, in which the write heat electric power Pw acquired from the heater set electric power table 50 is set, the write gate is turned on, and, at the same time, the heater is turned on in synchronization with the write gate so as to perform electric power distribution and heating; and, in step S5, test data is written over one track. When reach to a write end sector such as a predetermined final sector is determined in step S6, the heater and the write gate are turned off in step S7. Subsequently, in step S8, the read heat electric power Pr acquired from the heater set electric power table 50 is set. Subsequently, presence of an index which serves as a next rotation starting position is checked in step S9. When the index is determined, the process proceeds to step S10, in which the heater is turned on. Subsequently, whether it is a read starting sector or not is determined in step S11. In the present embodiment, since read of the latter half sectors of the one track where heating is stabilized is performed, a sector in the vicinity of the center of the one track is used as the read starting sector. When the read starting sector is determined in step S11, the process proceeds to step S12, in which the read gate is turned on so as to read the test data. Subsequently, when a read end sector at which a final sector or the like is set is determined in step S13, the heater and the read gate are turned off in step S14. Finally, in step S15, an error rate is measured based on the test data read in step S12, and it is used as an error rate threshold value.

Figure 20A:
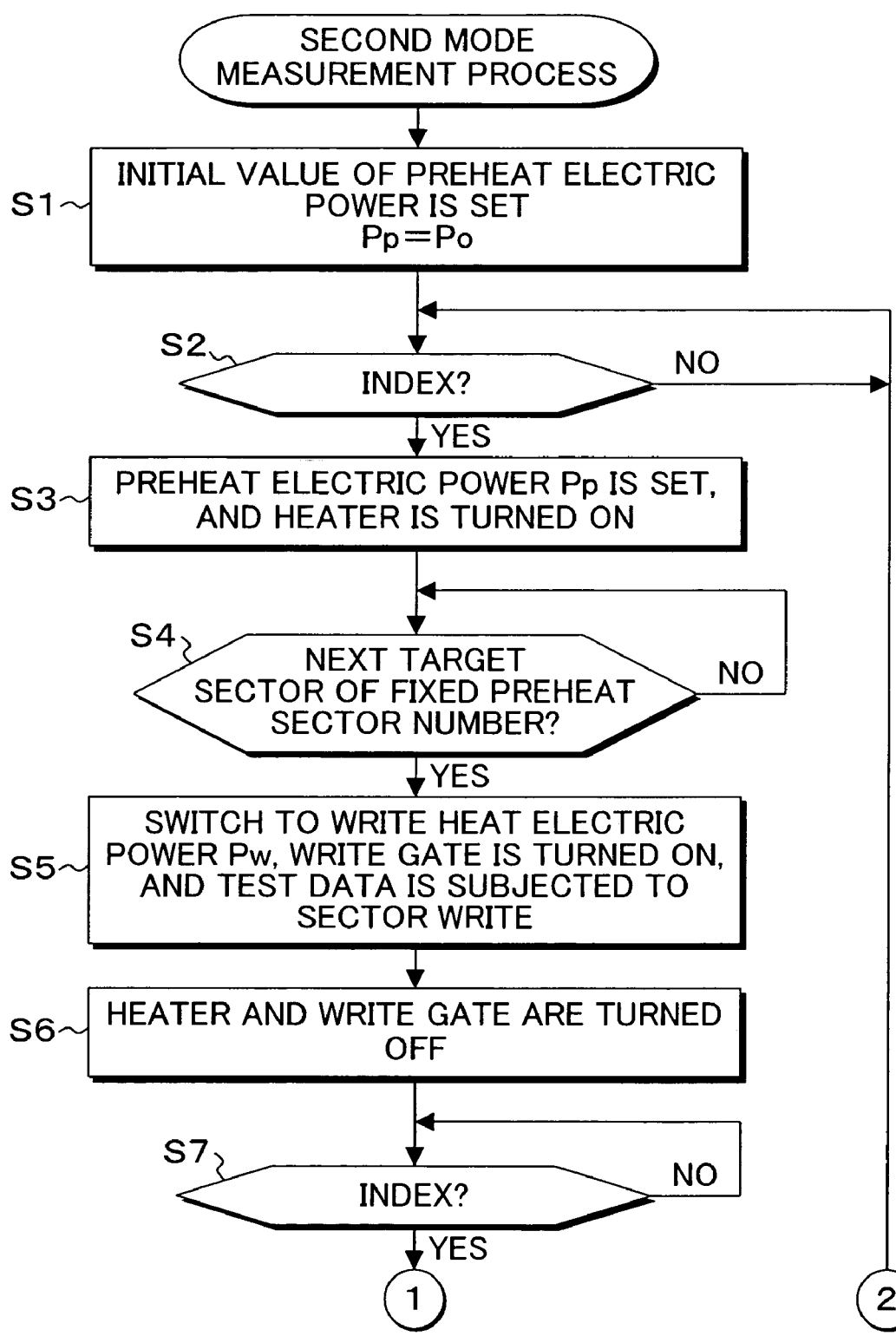
FIGS. 20A and 20B are flow charts showing a processing operation of the second mode measurement processing unit of FIG. 18 using error rate.
Figure 20B:
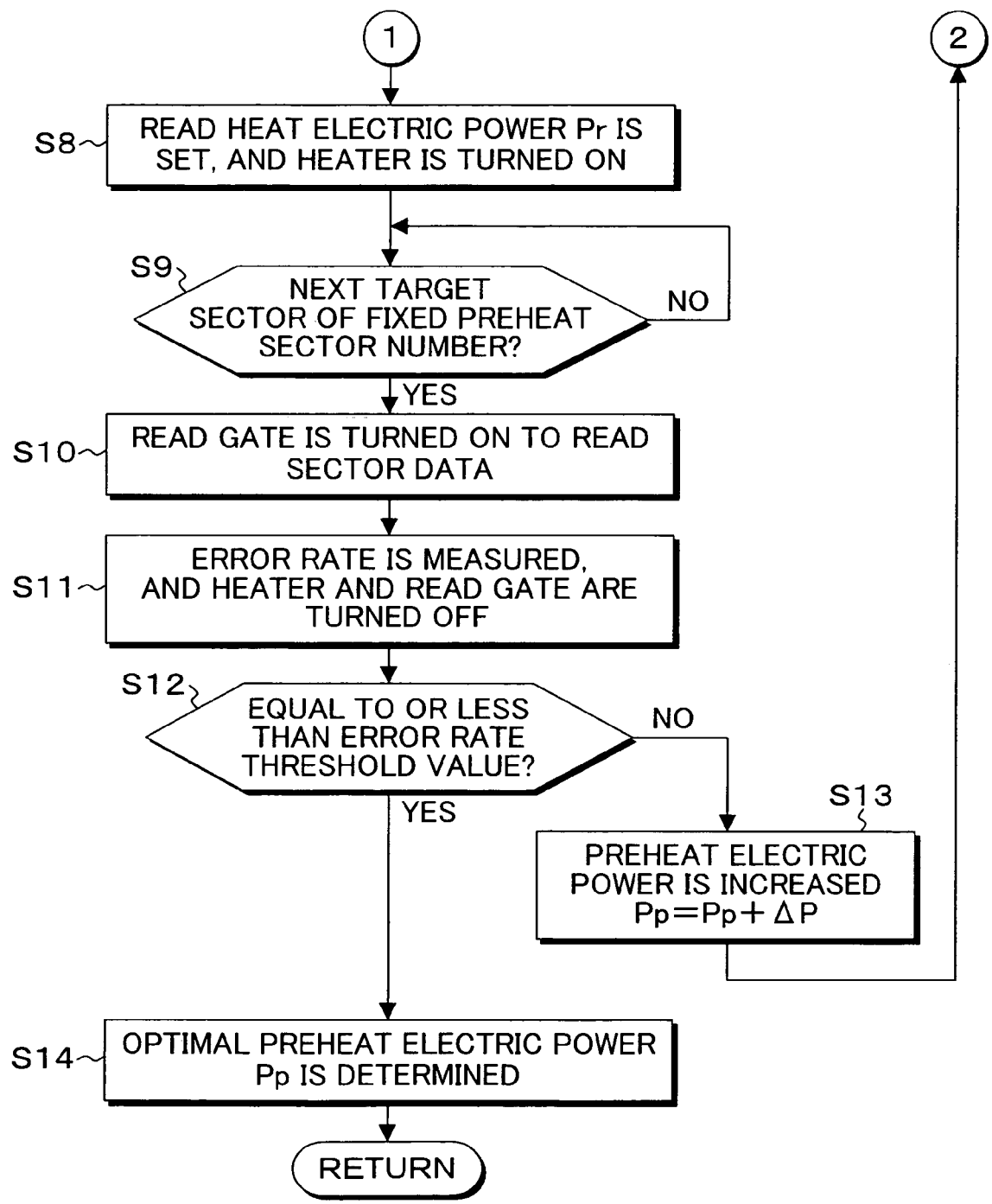

FIGS. 20A and 20B are flow charts showing details of the processing operation performed by the second mode measurement processing unit 100 of FIG. 18. In FIGS. 20A and 20B, the second mode measurement processing unit 100 of FIG. 18 sets an initial value Pp=Po of the preheat electric power Pp supplied to the heater up to the fixed preheat sector number N in step S1, and then waits for an index in step S2. When the index is determined in step S2, the process proceeds to step S3, in which the heater is turned on by using the preheat electric power Pp set in step S1, and whether it is a next sector (write top sector) of the fixed preheat sector number N or not is checked in step S4. When reach to the next sector of the fixed preheat sector number N is determined in step S4, the process proceeds to step S5, in which the electric power to the heater is switched to the write heat electric power Pw acquired from the set electric power table 50, and the write gate is turned on so as to write the test data to the sector. In next step S6, when the sector write is finished, the heater and the write gate are turned off. Then, a next index is awaited in step S7. When the index is determined, the process proceeds to step S8, in which the read heat electric power Pr acquired from the heater set electric power table 50 is set, and the heater is turned on. Subsequently, in step S9, whether it is a sector next to the fixed preheat sector number N or not is checked. When reach to the sector next to the fixed preheat sector number N is determined in step S9, the process proceeds to step S10, in which the read gate is turned on so as to read the sector data. In step S11, an error rate of the first sector specified by the counter C is calculated, and the heater and the read gate are turned off. Subsequently the process proceeds to step S12, in which whether the error rate calculated in step S11 is equal to or less than the error rate measured by the first mode measurement unit 98 is determined. At the beginning, since the preheat electric power Pp is low, heating and expansion caused by the heater electric power distribution is insufficient, the flying height has not reached the target flying height, and the error rate is in the state that is larger than the error rate threshold value. In this case, the preheat electric power Pp is increased by a predetermined value ΔP in step S13, and the process returns to step S2, win which a next index is awaited, and writing and reading of the test data is performed for a sector next to the fixed preheat sector number N so as to measure an error rate. When the error rates are measured through reading and writing of the test data while gradually increasing the preheat electric power Pp, the measured error rate becomes equal to or less than the error rate threshold value in step S12, and, in this case, the process proceeds to step S14, in which the preheat electric power Pp at which it is equal to or less than the error rate threshold value is determined as the optimal preheat electric power and registered in the control information table of FIGS. 1A and 1B.

Figure 21A:
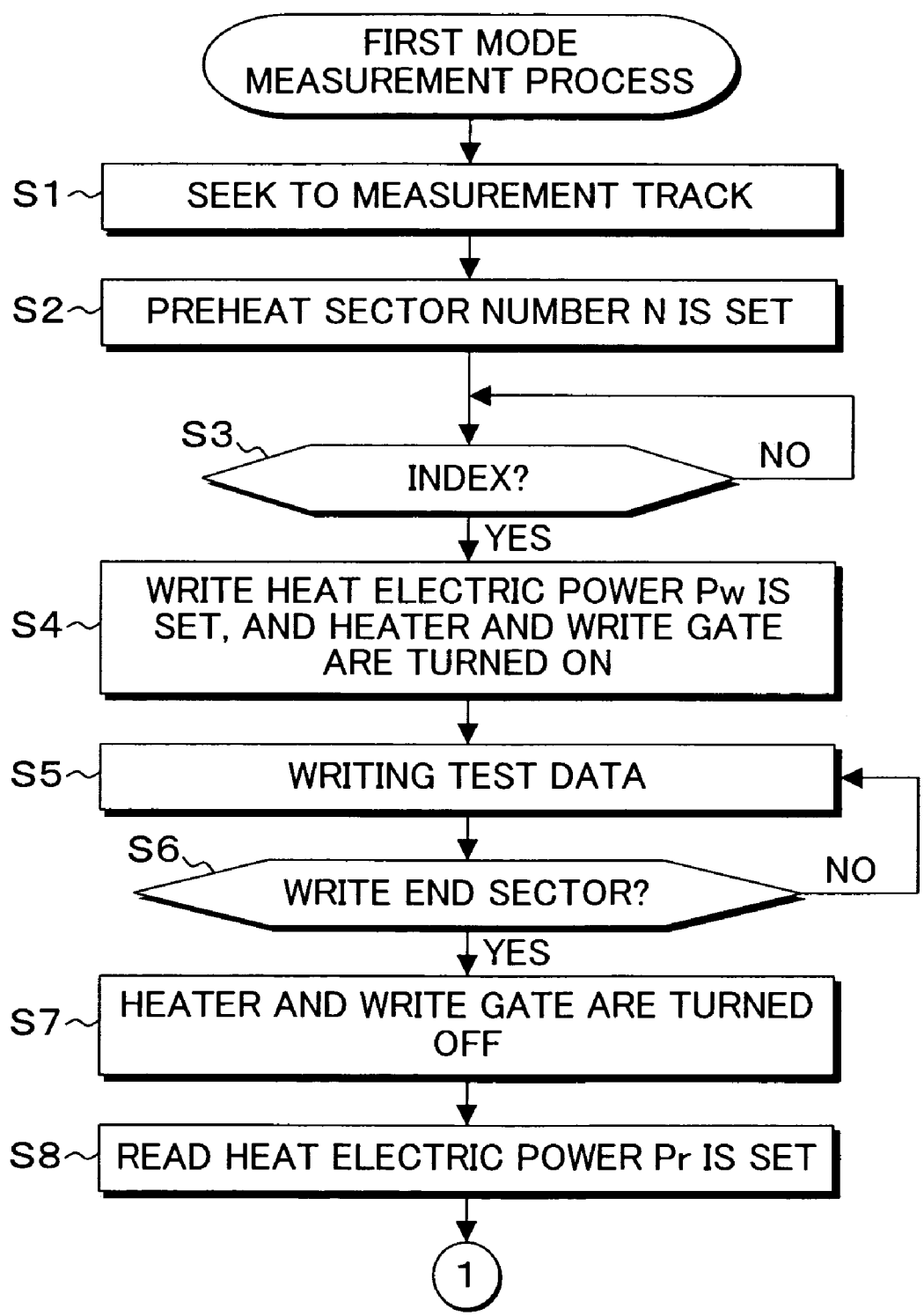
FIGS. 21A and 21B are flow charts showing a processing operation of the first mode measurement processing unit of FIG. 18 using the signal quality monitoring value of the read channel.
Figure 21B:
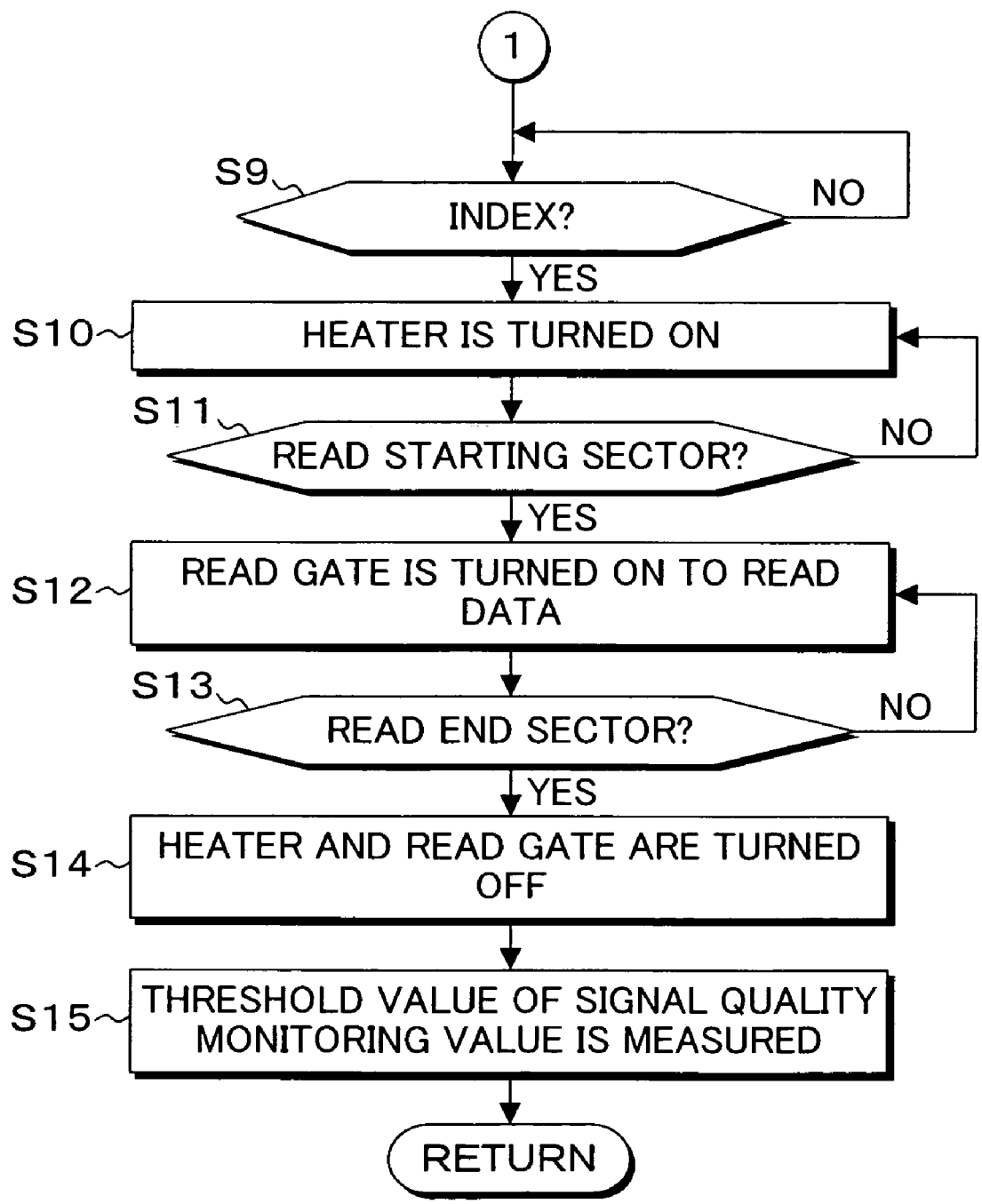

FIG. 21A, FIG. 21B, FIG. 22A, and FIG. 22B are flow charts of the first mode measurement process and the second mode measurement process of the case in which signal quality monitoring values obtained by the quality monitoring unit 92 provided in the read channel 42 of FIGS. 1A and 1B are used instead of the error rate in the embodiment of FIG. 19A, FIG. 19B, FIG. 20A, and FIG. 20B. The first mode measurement process of FIGS. 21A and 21B are basically same as the first mode measurement process of FIGS. 19A and 19B in which the error rate is measured, and is different in the point that the signal quality monitoring value is measured as measurement in step S15 and used as the threshold value.

Figure 22A:
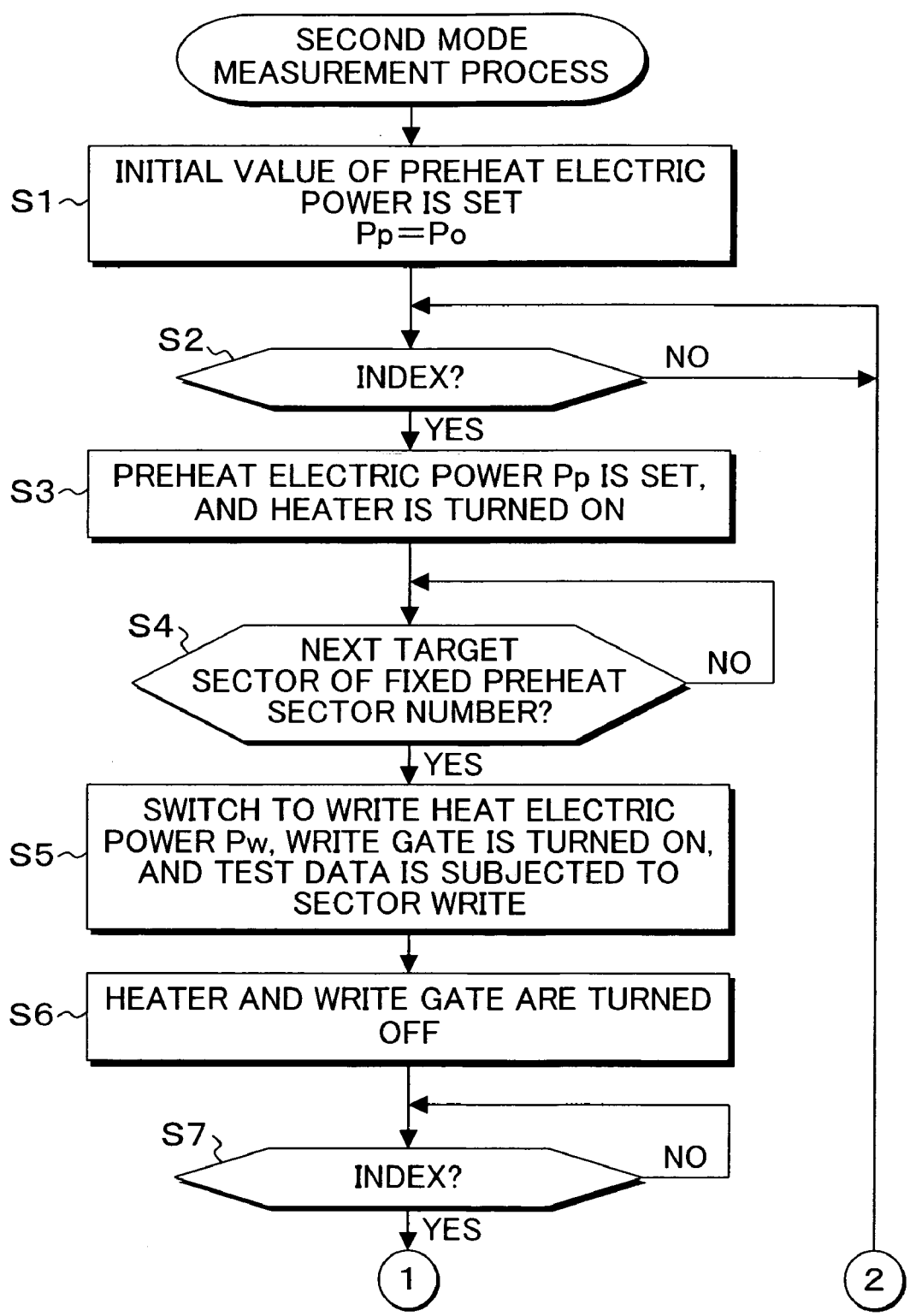
FIGS. 22A and 22B are flow charts showing a processing operation of the second mode measurement processing unit of FIG. 18 using the signal quality monitoring value of the read channel.
Figure 22B:
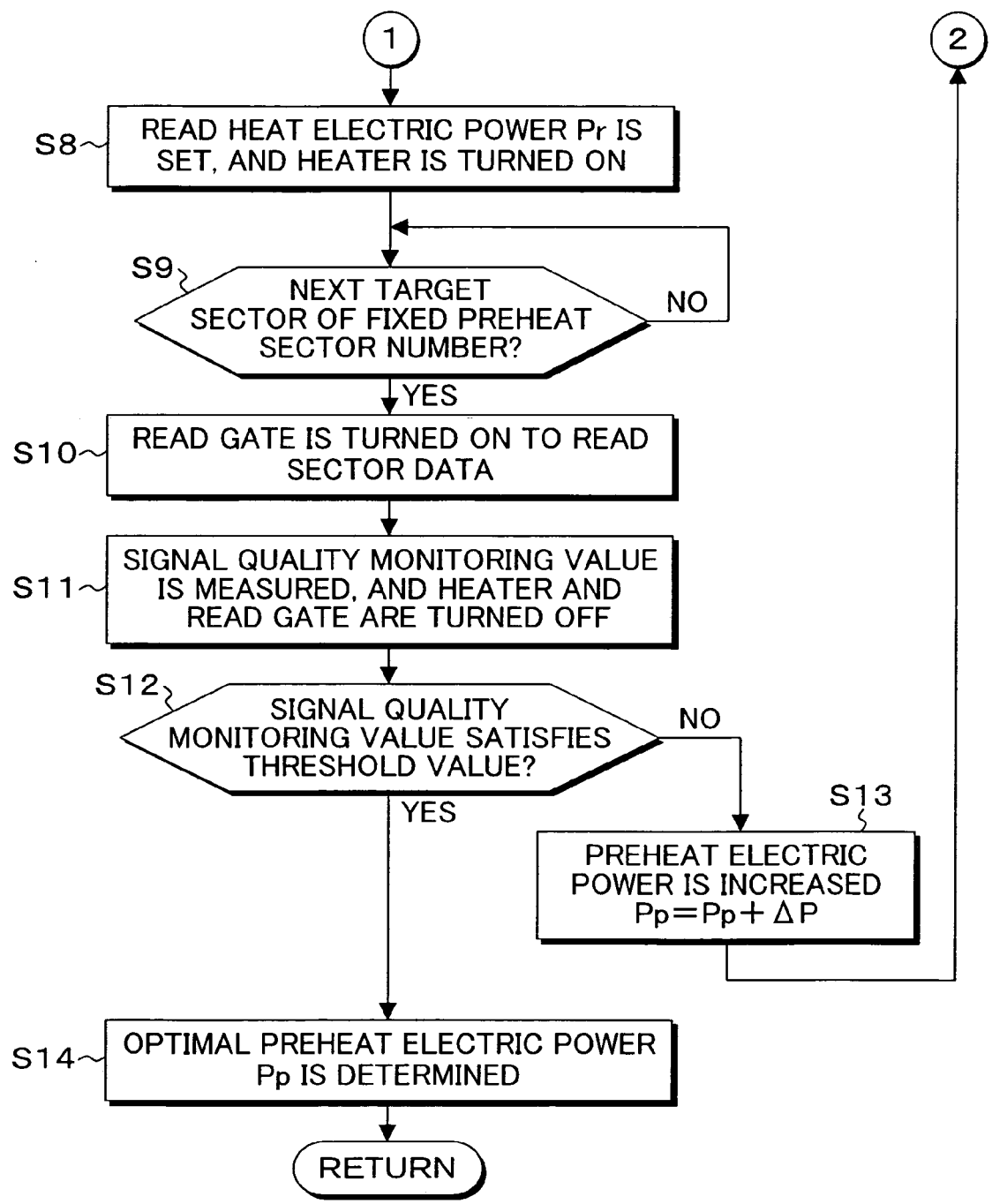

Also, FIGS. 22A and 22B are flow charts showing details of the second mode measurement process in which the signal quality monitoring values are measured. The flow chart of the second mode measurement process of FIGS. 22A and 22B are also same as the flow chart of the second mode measurement process shown in FIGS. 20A and 20B in which the error rates are measured, and is different merely in the point that it is a process using the signal quality monitoring values in step S11 and step S12.

Figure 23:
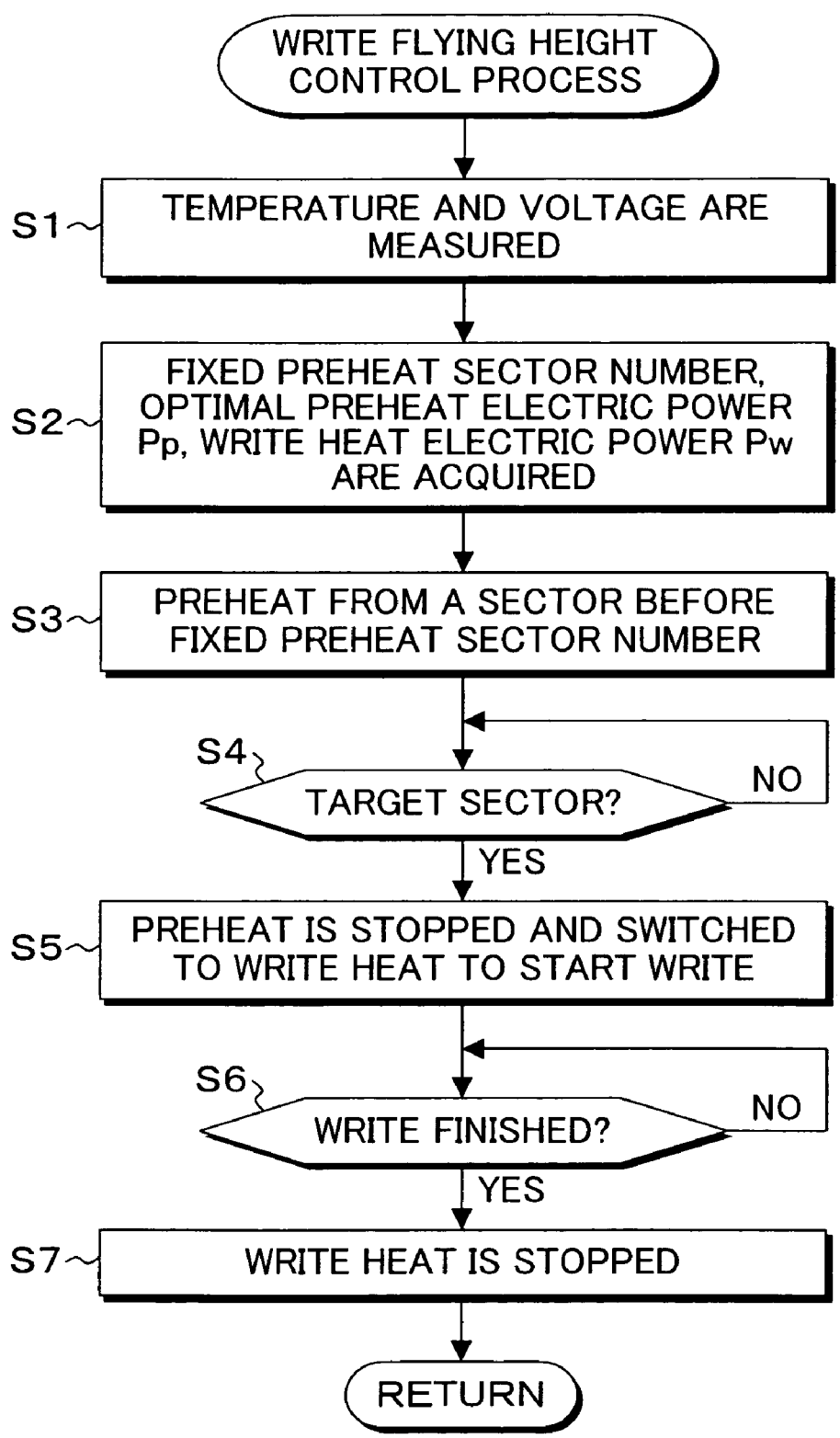
FIG. 23 is a flow chart showing a processing operation of the write flying height control processing unit of FIG. 18.

FIG. 23 is a flow chart showing the processing operation performed by the write flying height control unit 102 of FIG. 18. First of all, the temperature and the voltage are measured in step S1. Then, in step S2, the fixed preheat sector number N, which is set in advance, is acquired, and the optimal preheat electric power Pp and the write heat electric power Pw are acquired from the heater set electric power table 50. Subsequently, in step S3, the preheat electric power Pp is supplied to the heater from a sector which is before the target frame by the fixed preheat sector number N so as to start preheating. Reach to the target sector is checked in step S4 in this preheating state; and, when it reaches the target sector, in step S5, the preheating is stopped, and it is switched to the write heat electric power Pw which is distributed to the heater so as to start write heating. When write end is determined in step S6 in this write heating state, the write heating is stopped in step S7. By virtue of such preheating, at the point when the target frame reaches the head, the head is controlled to the write target flying height which for example satisfies a predetermined error rate or to the vicinity thereof, and data can be written to the magnetic disk by the optimal flying height between the head and the magnetic disk.

Figure 24:
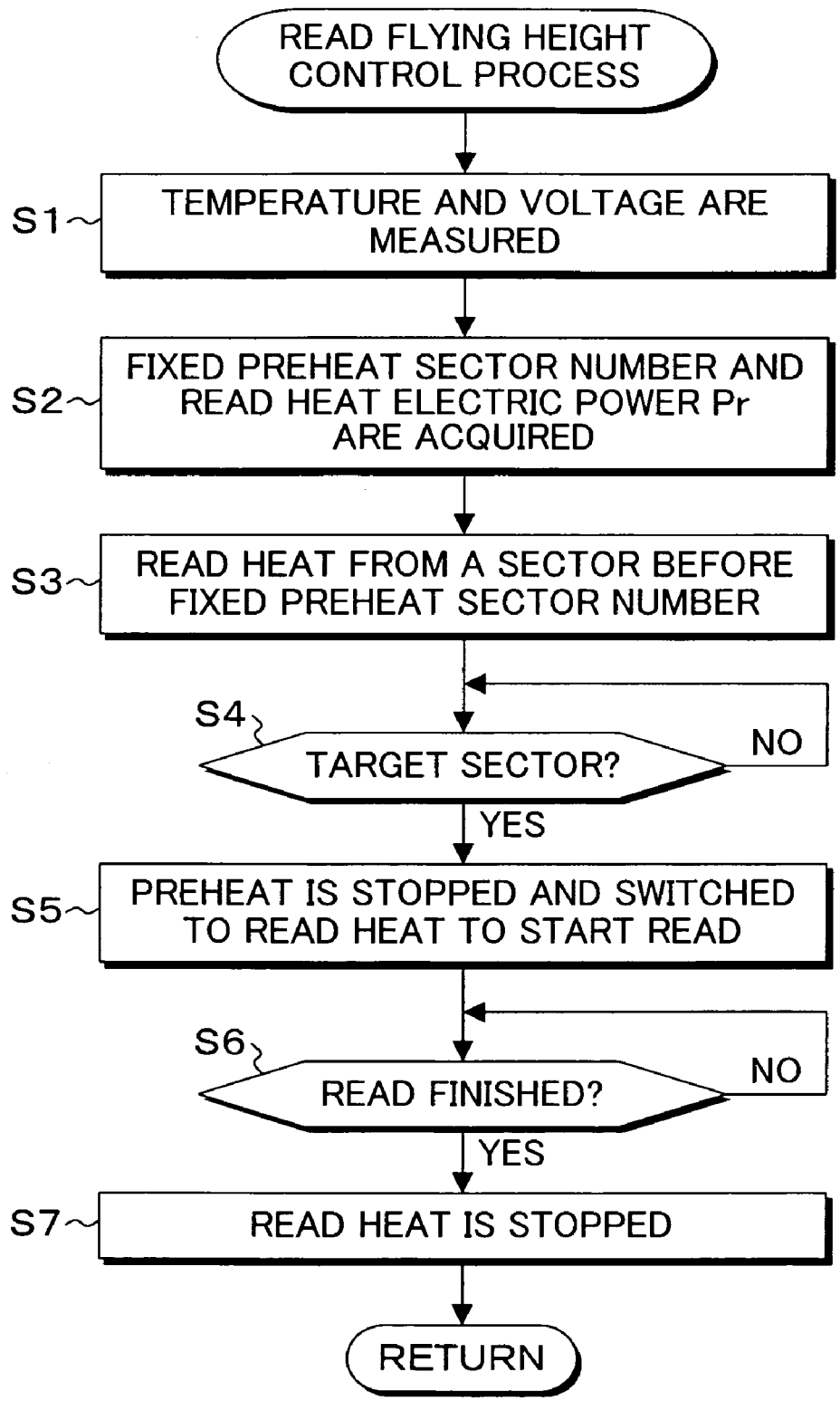
FIG. 24 is a flow chart showing a processing operation of the flying height control processing unit of FIG. 18.

FIG. 24 is a flow chart showing details of the processing operation performed by the read flying height control unit 104 of FIG. 18. First of all, the temperature and the voltage are measured in step S1, and then, in step S2, the fixed preheat sector number N, which is set in advance, is acquired, and the optimal preheat electric power Pp and the read heat electric power Pr are acquired from the heater set electric power table 50. Next, in step S3, the optimal preheat electric power Pp is supplied to the heater from a sector which is before by the fixed preheat sector number N so as to start read heating. When reach to the target sector is determined in step S4 in this read heating state, in step S5, the preheating is stopped, and it is switched to read heating by the read heat electric power Pr so as to start reading. Subsequently, when read end is determined in step S6, the read heating is stopped in step S7. The present invention also provides programs for executing the control information measurement unit 45 and the flying height measurement processing unit 46 executed by the MPU 26 provided in the magnetic disk apparatus of FIG. 4; and the programs have processing contents shown in the flow charts of FIG. 8, FIG. 9, FIG. 10A, FIG. 10B, FIG. 12A, FIG. 12B, FIG. 14A, FIG. 14B, FIG. 16, FIG. 17, and FIG. 19A to FIG. 24. The present invention also provides the control device of the magnetic disk apparatus of FIGS. 1A and 1B; and, in the present embodiment, the control device corresponds to the LSI device 25 shown in the control board 12 of FIGS. 1A and 1B. The present invention also provides programs of the control information measurement processes and the flying height control processes. The programs have the contents shown in the flow charts shown in FIG. 8, FIG. 9, FIG. 10A, FIG. 10B, FIG. 12A, FIG. 12B, and FIG. 14A to FIG. 16. Furthermore, the present invention provides a computer-readable storage medium in which the programs of the control information measurement processes and the flying height control processes are stored. Examples of the storage medium include portable-type storage media such as a floppy disk (R), a DVD disk, a magneto-optical disk, and an IC card; a storage apparatus such as a hard disk drive provided inside/outside a computer system; a database retaining programs via a line or another computer system and a database thereof; and an on-line transmission medium. In the above described embodiments, measurement is performed with the apparatus operating temperatures separated in four levels as the control information table 48, the heater set electric power table 50, and the preheat sector number administration table 52 of FIG. 4; however, it is also permissible to use merely the normal temperature TN as the apparatus operating temperature, obtain a temperature correction coefficient for each of the control parameters in advance, and alternatively use temperature correction of the control parameters, which is based on the temperature difference between an actual apparatus operating temperature and a reference temperature and using the correction coefficients. Note that the present invention includes arbitrary modifications that do not impair the object and advantages thereof, and is not limited by the numerical values shown in the above descried embodiments.

What is claimed is:

1. A control device of a storage apparatus having a head which has a reading element and a recording element, is provided with a heater which varies a protrusion value by thermal expansion accompanying electric power distribution and heating, and flies above a rotating recording medium so as to access data, the control device characterized by having a preheat sector number measurement unit which, upon desired correction, measures a preheat sector number corresponding to transition time from when electric power distribution to and heating of the heater is started by predetermined preheat electric power until when a flying height is stabilized to a predetermined target flying height; and a flying height control unit which, upon reproduction or recording, distributes electric power to the heater from a sector position before a target sector by the preheat sector number so as to preliminarily heat the heater and then controls the flying height of the head to the predetermined target flying height from a target sector position; and wherein the preheat sector number measurement unit has a first mode measurement processing unit which writes test data over one track by the recording element by using a rotation reference position as a starting point in a state in which positioning to an arbitrary measurement track of the recording medium is achieved and while distribution of the preheat electric power to and heating of the heater is performed, and then reads the test data by the reading element so as to measure a predetermined evaluation value as a threshold value; and a second mode measurement processing unit which starts distribution of the preheat electric power to and heating of the heater by using the rotation reference position as a starting point, sequentially performs writing and reading of test data to or from each of sectors on the measurement track so as to measure the evaluation value in the order of the sectors, and, when the sector which satisfies the evaluation threshold value is determined, determines the number of sectors up to the determined sector as the preheat sector number.

2. The control device according to claim 1, characterized in that the first mode measurement processing unit reads the test data so as to measure an error rate threshold value; and, when an error rate is measured in the order of the sectors and the sector equal to or less than the error rate threshold value is determined, the second mode measurement unit determines the number of sectors up to the determined sector as the preheat sector number.

3. The control device according to claim 1, characterized in that the first mode measurement processing unit reads the test data so as to measure a signal quality monitoring value and use the value as a threshold value; and, when the sector which satisfies the threshold value is determined by measuring the signal quality monitoring value in the order of the sectors, the second mode measurement unit determines the number of sectors up to the determined sector as the preheat sector number.

4. The control device according to claim 1, characterized in that the preheat sector number measurement unit measures the preheat sector number separately for at least any one of the head, a zone of the recording medium, and an operating temperature of the apparatus.

5. The control device according to claim 1, characterized in that the flying height control unit has a write flying height control unit which distributes predetermined preheat electric power to the heater from a sector position which is before the target sector by the preheat sector number so as to preliminarily heat the heater, switches the electric power to write heat electric power which is for control to a predetermined write target clearance when the head reaches the target sector so as to perform recording, and stops the heater electric power distribution at a next sector position after recording is finished; and a read flying height control unit which distributes predetermined preheat electric power to the heater from a sector position which is before the target sector by the preheat sector number so as to preliminarily heat the heater, switches the electric power to read heat electric power which is for control to a predetermined read target clearance when the head reaches the target sector so as to perform reading, and stops the heater electric power distribution at a next sector position after reading is finished.

6. The control device according to claim 5, characterized in that the write flying height control unit performs switch to, as the write heat electric power, electric power which is obtained by subtracting heat electric power corresponding to flying height variation according to a recording current protrusion value of the recording element from the preheat electric power; and the read flying height control unit sustains electric power which is same as the preheat electric power as the read heat electric power.

7. A control method of a storage apparatus having a head which has a reading element and a recording element, is provided with a heater which varies a protrusion value by thermal expansion accompanying electric power distribution and heating, and flies above a rotating recording medium so as to access data, the control method characterized by having a preheat sector number measurement step in which, upon desired correction, a preheat sector number corresponding to transition time from when electric power distribution to and heating of the heater is started by predetermined preheat electric power until when a flying height is stabilized to a predetermined target flying height is measured; and a flying height control step in which, upon reproduction or recording, electric power is distributed to the heater from a sector position before a target sector by the preheat sector number so as to preliminarily heat the heater and then the flying height of the head is controlled to the predetermined target flying height from a target sector position; and wherein the preheat electric power measurement step has a first mode measurement processing step in which test data is written over one track by the recording element by using a rotation reference position as a starting point in a state in which positioning to an arbitrary measurement track of the recording medium is achieved and while distribution of the preheat electric power to and heating of the heater is performed, and then the test data is read by the reading element so as to measure a predetermined evaluation value as a threshold value; and a second mode measurement processing step in which writing and reading of test data to or from a next target sector of the fixed preheat sector number is sequentially performed by using the rotation reference position as a starting point while preheat electric power is varied so as to measure the evaluation value, and the preheat electric power which satisfies the evaluation threshold value is determined as optimal preheat electric power which is distributed over the fixed preheat sector number.

8. A storage apparatus characterized by having a head which has a reading element and a recording element, is provided with a heater which varies a protrusion value by thermal expansion accompanying electric power distribution and heating, and flies above a rotating recording medium so as to access data;

a preheat sector number measurement unit which, upon desired correction, measures a preheat sector number corresponding to transition time from when electric power distribution to and heating of the heater is started by predetermined preheat electric power until when a flying height is stabilized to a predetermined target flying height; and a flying height control unit which, upon reproduction or recording, distributes electric power to the heater from a sector position before a target sector by the preheat sector number so as to preliminarily heat the heater and then controls the flying height of the head to the predetermined target flying height from a target sector position; and wherein the preheat sector number measurement unit has a first mode measurement Processing unit which writes test data over one track by the recording element by using a rotation reference position as a starting point in a state in which Positioning to an arbitrary measurement track of the recording medium is achieved and while distribution of the preheat electric power to and heating of the heater is performed, and then reads the test data by the reading element so as to measure a predetermined evaluation value as a threshold value; and a second mode measurement Processing unit which starts distribution of the preheat electric power to and heating of the heater by using the rotation reference position as a starting point, seouentiallv performs writing and reading of test data to or from each of sectors on the measurement track so as to measure the evaluation value in the order of the sectors, and, when the sector which satisfies the evaluation threshold value is determined, determines the number of sectors up to the determined sector as the nreheat sector number.

9. A control device of a storage apparatus having a head which has a reading element and a recording element, is provided with a heater which varies a protrusion value by thermal expansion accompanying electric power distribution and heating, and flies above a rotating recording medium so as to access data, the control device characterized by having a preheat electric power measurement unit which, upon desired correction, measures optimal preheat electric power which stabilizes a flying height to a predetermined target flying height when the head reaches a target sector through electric power distribution and heating over a predetermined fixed preheat sector number; and a flying height control unit which, upon reproduction or recording, sets the optimal preheat electric power and distributes the electric power to the heater from a sector position before a target sector by the preheat sector number so as to preliminarily heat the heater and then controls the flying height of the head to the predetermined target flying height from a target sector position; and wherein the preheat electric power measurement unit has a first mode measurement processing unit which writes test data over one track by the recording element by using a rotation reference position as a staffing point in a state in which positioning to an arbitrary measurement track of the recording medium is achieved and while distribution of the preheat electric power to and heating of the heater is performed, and then reads the test data by the reading element so as to measure a predetermined evaluation value as a threshold value; and a second mode measurement processing unit which sequentially performs writing and reading of test data to or from a next target sector of the fixed preheat sector number by using the rotation reference position as a starting point while preheat electric power is varied so as to measure the evaluation value, and determines the preheat electric power which satisfies the evaluation threshold value as optimal preheat electric power which is distributed over the fixed preheat sector number.

10. The control device according to claim 9, characterized in that the first mode measurement processing unit reads the test data so as to measure an error rate threshold value; and, when an error rate is measured in the order of the sectors and the sector equal to or less than the error rate threshold value is determined, the second mode measurement unit determines the preheat electric power at that point as the optimal preheat electric power.

11. The control device according to claim 9, characterized in that the first mode measurement processing unit reads the test data so as to measure a signal quality monitoring value and use the value as a threshold value; and, when the sector which satisfies the threshold value is determined by measuring the signal quality monitoring value in the order of the sectors, the second mode measurement unit determines the preheat electric power at that point as the optimal preheat electric power.

12. The control device according to claim 9, characterized in that the preheat electric power measurement unit measures the optimal preheat electric power separately for at least any one of the head, a zone of the recording medium, and an operating temperature of the apparatus.

13. The control device according to claim 9, characterized in that the flying height control unit has a write flying height control unit which distributes the optimal preheat electric power to the heater from a sector position which is before the target sector by the fixed preheat sector number so as to preliminarily heat the heater, switches the electric power to write heat electric power which is for control to a predetermined write target clearance when the head reaches the target sector so as to perform recording, and stops the heater electric power distribution at a next sector position after recording is finished; and a read flying height control unit which distributes the optimal preheat electric power to the heater from a sector position which is before the target sector by the fixed preheat sector number so as to preliminarily heat the heater, switches the electric power to read heat electric power which is for control to a predetermined read target clearance when the head reaches the target sector so as to perform reading, and stops the heater electric power distribution at a next sector position after reading is finished.

14. A control method of a storage apparatus having a head which has a reading element and a recording element, is provided with a heater which varies a protrusion value by thermal expansion accompanying electric power distribution and heating, and flies above a rotating recording medium so as to access data, the control device characterized by having a preheat electric power measurement step in which, upon desired correction, optimal preheat electric power which stabilizes a flying height to a predetermined target flying height when the head reaches a target sector through electric power distribution and heating over a predetermined fixed preheat sector number is measured; and a flying height control step in which, upon reproduction or recording, the optimal preheat electric power is set and distributed to the heater from a sector position before a target sector by the preheat sector number so as to preliminarily heat the heater, and then the flying height of the head is controlled to the predetermined target flying height from a target sector position; and wherein the preheat electric power measurement step has a first mode measurement processing step in which test data is written over one track by the recording element by using a rotation reference position as a starting point in a state in which positioning to an arbitrary measurement track of the recording medium is achieved and while distribution of the preheat electric power to and heating of the heater is performed, and then the test data is read by the reading element so as to measure a predetermined evaluation value as a threshold value; and a second mode measurement processing step in which writing and reading of test data to or from a next target sector of the fixed preheat sector number is sequentially performed by using the rotation reference position as a starting point while preheat electric power is varied so as to measure the evaluation value, and the preheat electric power which satisfies the evaluation threshold value is determined as optimal preheat electric power which is distributed over the fixed vreheat sector number.

15. A storage apparatus having a head which has a reading element and a recording element, is provided with a heater which varies a protrusion value by thermal expansion accompanying electric power distribution and heating, and flies above a rotating recording medium so as to access data;

a preheat electric power measurement unit which, upon desired correction, measures optimal preheat electric power which stabilizes a flying height to a predetermined target flying height when the head reaches a target sector through electric power distribution and heating over a predetermined fixed preheat sector number; and a flying height control unit which, upon reproduction or recording, sets the optimal preheat electric power and distributes the electric power to the heater from a sector position before a target sector by the preheat sector number so as to preliminarily heat the heater, and then controls the flying height of the head to the predetermined target flying height from a target sector position; and wherein the preheat electric power measurement unit has a first mode measurement processing unit which writes test data over one track by the recording element by using a rotation reference position as a starting point in a state in which positioning to an arbitrary measurement track of the recording medium is achieved and while distribution of the preheat electric power to and heating of the heater is performed, and then the test data is read by the reading element so as to measure a predetermined evaluation value as a threshold value; and a second mode measurement processing unit which sequentially performs writing and reading of test data to or from a next target sector of the fixed preheat sector number by using the rotation reference position as a starting point while preheat electric power is varied so as to measure the evaluation value, and determine the preheat electric power which satisfies the evaluation threshold value as optimal preheat electric power which is distributed over the fixed preheat sector number.

* * * * *

UNITED STATES PATENT AND TRADEMARK OFFICE
CERTIFICATE OF CORRECTION

PATENT NO. : 7,430,090 B2
APPLICATION NO. : 11/645047
DATED : September 30, 2008
INVENTOR(S) : Oyamada et al.

It is certified that error appears in the above-identified patent and that said Letters Patent is hereby corrected as shown below:

Col. 24, line 52, delete "Positioning" and insert --positioning--.

Col. 24, line 61, delete "seouentially" and insert --sequentially--.

Col. 24, line 61, delete "nreheat" and insert --preheat--.

Signed and Sealed this

Twenty-fourth Day of March, 2009

JOHN DOLL
*Acting Director of the United States Patent and Trademark Office*